(12) United States Patent
Jeon

(10) Patent No.: US 10,320,067 B2
(45) Date of Patent: Jun. 11, 2019

(54) DEVICE AND METHOD FOR PERFORMING COMMUNICATION

(71) Applicant: Samsung Electronics Co., Ltd., Gyeonggi-do (KR)

(72) Inventor: Jae Woong Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 15/415,612

(22) Filed: Jan. 25, 2017

(65) Prior Publication Data

US 2017/0214132 A1    Jul. 27, 2017

(30) Foreign Application Priority Data

Jan. 26, 2016    (KR) .................. 10-2016-0009357

(51) Int. Cl.

| | |
|---|---|
| *H01Q 1/38* | (2006.01) |
| *G06Q 20/32* | (2012.01) |
| *H01Q 1/24* | (2006.01) |
| *H04B 5/00* | (2006.01) |
| *H01Q 1/52* | (2006.01) |
| *H01Q 7/04* | (2006.01) |
| *H01Q 7/06* | (2006.01) |
| *H01Q 21/28* | (2006.01) |
| *H01Q 25/00* | (2006.01) |

(52) U.S. Cl.
CPC .......... *H01Q 1/38* (2013.01); *G06Q 20/3278* (2013.01); *H01Q 1/242* (2013.01); *H04B 5/0025* (2013.01); *H01Q 1/243* (2013.01); *H01Q 1/526* (2013.01); *H01Q 7/04* (2013.01); *H01Q 7/06* (2013.01); *H01Q 21/28* (2013.01); *H01Q 25/002* (2013.01)

(58) Field of Classification Search
CPC ........ H01Q 1/38; H01Q 1/242; H01Q 25/002; H01Q 21/28; H01Q 7/06; G06Q 20/3278; H04B 5/0025
USPC .......................................... 343/702, 700 MS
See application file for complete search history.

(56) References Cited

U.S. PATENT DOCUMENTS

| | | |
|---|---|---|
| 8,054,231 B2 | 11/2011 | Ahn et al. |
| 8,676,116 B2 | 3/2014 | Zhu et al. |
| (Continued) | | |

FOREIGN PATENT DOCUMENTS

| | | |
|---|---|---|
| EP | 2579388 A2 | 4/2013 |
| KR | 20080037228 A | 4/2008 |
| (Continued) | | |

OTHER PUBLICATIONS

Notification of Transmittal of the International Search Report and the Written Opinion of the International Searching Authority, or the Declaration dated May 1, 2017 in connection with International Patent Application No. PCT/KR2017/000573.

(Continued)

*Primary Examiner* — Hai V Tran

(57) ABSTRACT

An electronic device includes a first antenna pattern for a first communication network and a first communication circuit configured to perform communication through the first antenna pattern. The electronic device also includes an electrical component situated at an upper part of the electronic device and a circuit board that is attached to a rear surface of the electrical component. The first antenna pattern is arranged on the circuit board facing toward a rear surface of the electronic device.

18 Claims, 27 Drawing Sheets

(56) References Cited

U.S. PATENT DOCUMENTS

| | | | |
|---|---|---|---|
| 9,621,230 B2* | 4/2017 | Ouyang | H04B 5/0081 |
| 2004/0160370 A1 | 8/2004 | Ghosh et al. | |
| 2006/0094378 A1* | 5/2006 | Murray | H04M 1/03 |
| | | | 455/128 |
| 2009/0146898 A1* | 6/2009 | Akiho | H01Q 1/243 |
| | | | 343/787 |
| 2009/0278757 A1 | 11/2009 | Ahn et al. | |
| 2011/0037664 A1 | 2/2011 | Cho et al. | |
| 2011/0050164 A1 | 3/2011 | Partovi et al. | |
| 2014/0213178 A1 | 7/2014 | Wolff et al. | |
| 2014/0247192 A1 | 9/2014 | Ikemoto | |
| 2014/0299667 A1 | 10/2014 | Baek et al. | |
| 2015/0059173 A1 | 3/2015 | Han et al. | |
| 2015/0091502 A1 | 4/2015 | Mukherjee et al. | |
| 2015/0148096 A1* | 5/2015 | Chae | H04M 1/0264 |
| | | | 455/552.1 |
| 2016/0247057 A1* | 8/2016 | Lee | G06K 19/0727 |
| 2016/0372837 A1* | 12/2016 | Jung | H04B 5/0031 |

FOREIGN PATENT DOCUMENTS

| | | |
|---|---|---|
| KR | 20090116030 A | 11/2009 |
| KR | 20130045307 A | 5/2013 |
| KR | 20150024692 A | 3/2015 |
| WO | 2015/103787 A1 | 7/2015 |
| WO | 2015/134119 A1 | 9/2015 |

OTHER PUBLICATIONS

Supplementary European Search Report dated Aug. 6, 2018 in connection with European Patent Application No. 17 74 4501, 10 pages.

* cited by examiner

DEVICE AND METHOD FOR PERFORMING COMMUNICATION

CROSS-REFERENCE TO RELATED APPLICATION(S) AND CLAIM OF PRIORITY

The present application is related to and claims the benefit under 35 U.S.C. § 119(a) of a Korean patent application filed on Jan. 26, 2016 in the Korean Intellectual Property Office and assigned Serial number 10-2016-0009357, the entire disclosure of which is hereby incorporated by reference.

TECHNICAL FIELD

The present disclosure relates to an electronic device and a method for performing communication.

BACKGROUND

Due to the recent development of the information/communication technology, network devices such as base stations are installed all over Korea, and electronic device may allow the user to freely use networks all over Korea, by transmitting and receiving data to and from another device through the networks.

Various types of electronic devices have recently provided various functions due to the trend of digital convergence. For example, the smartphones not only allow voice communications but also support an Internet connection function by using a network, a music or video reproducing function, and a function of photographing pictures or videos by using image sensors.

The electronic device may further use a network for transmission and reception of data, as well as a network for a voice call, and has to include antennas corresponding to the networks to implement the networks.

When performing short range communication, an electronic device may recognize a short range communication reader only in one direction by employing a loop antenna on one surface thereof. Due to this, when the direction of the electronic device that faces the short range communication reader is not suitable to a degree, the short range communication reader fails to recognize the electronic device and the electronic device has to be gripped again.

SUMMARY

To address the above-discussed deficiencies, it is a primary object to provide at least the advantages described below. Accordingly, an aspect of the present disclosure is to provide an electronic device and a method for performing communication. The present disclosure also provides a method of performing communication (for example, short range communication) in various directions without performing communication only in one direction of an electronic device.

According to various embodiments of the present disclosure, there is provided an electronic device including a first antenna pattern for a first communication network, a first communication circuit configured to perform communication through the first antenna pattern, an electrical component situated at an upper part of the electronic device, and a circuit board attached to a rear surface of the electrical component, wherein the first antenna pattern is arranged on the circuit board facing toward a rear surface of the electronic device.

According to various embodiments of the present disclosure, there is provided an electronic device including a housing that includes a first surface and a second surface that faces an opposite side of the first surface, a communication circuit that is disposed in an interior of the housing, at least one electrical component that is disposed in the interior of the housing to be closer to the first surface than to the second surface, a conductive plate, at least a portion of which is disposed between the at least one electrical component and the second surface and that is configured to shield at least a portion of an electric field and/or a magnetic field generated by the at least one electrical component, a printed circuit board (PCB) that is disposed between the conductive plate and the second surface, and a conductive pattern that is disposed in an interior of and/or on at least one surface of the printed circuit board and is electrically connected to the communication circuit.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
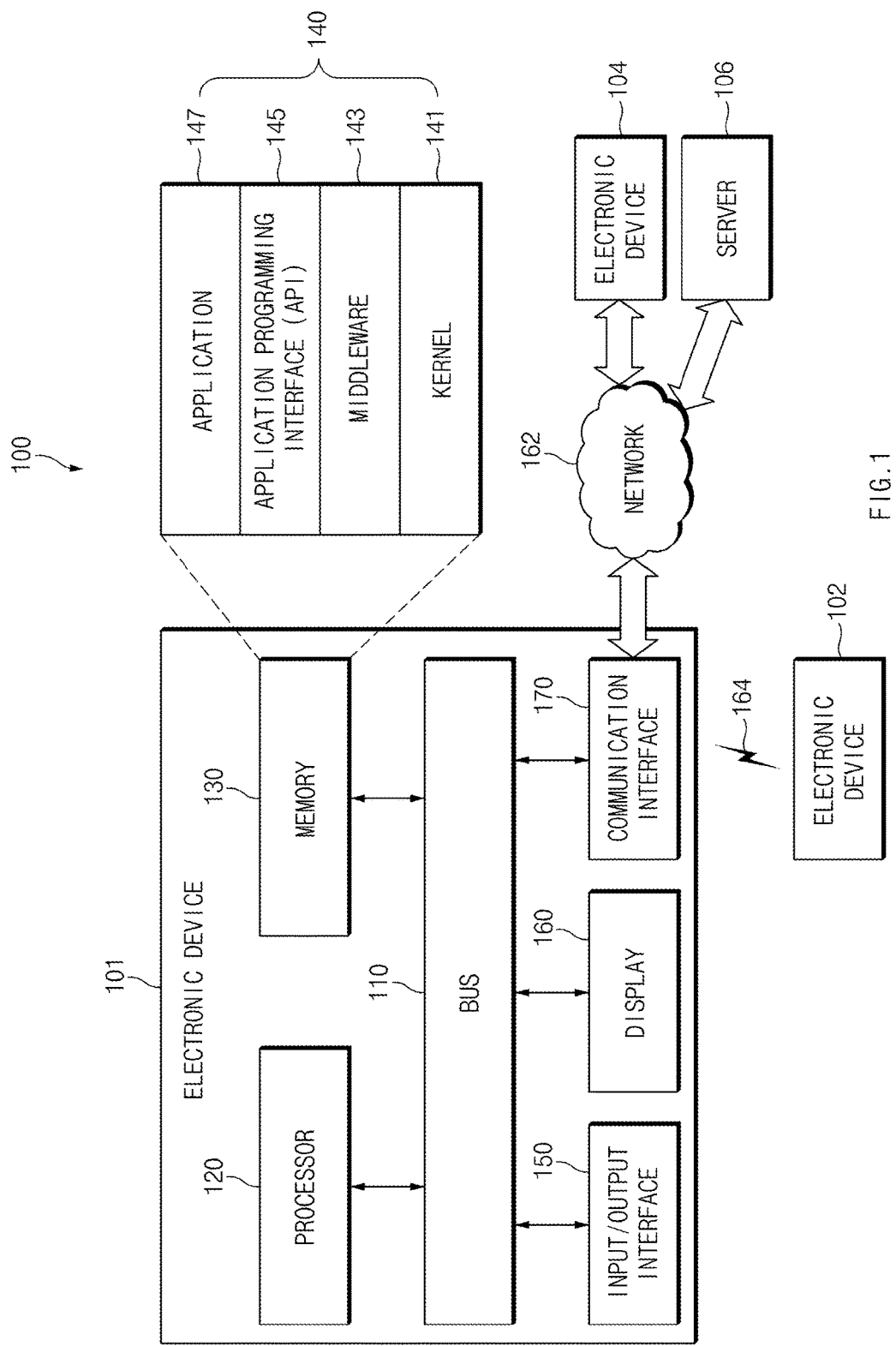
FIG. 1 illustrates an electronic device in a network environment according to various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, SAMSUNG HOMESYNC™, APPLE TV®, or GOOGLE TV®), a game console (for example, XBOX® or PLAYSTATION®), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificially intelligent electronic device) that uses an electronic device.

Hereinafter, it will be exemplified in the accompanying drawings that an electronic device according to various embodiments of the present disclosure is a smartphone.

Referring to FIG. 1, an electronic device 2500 in a network environment according to various embodiments will be described. The electronic device 100 may include a bus 110, a processor 120, a memory 130, an input/output interface 150, a display 160, and a communication interface 170. In some embodiments, the electronic device 100 may exclude at least one of the elements or may additionally include another element.

The bus 110, for example, may include a circuit that connects the elements 110 to 170 and transfers communications (for example, control messages and/or data) between the elements.

The processor 120 may include one or more of a central processing unit (CPU), an application processor (AP), or a communication processor (CP). The processor 120, for example, may execute operations or data processing related to the control and/or communication of at least one other element of the electronic device 100.

The memory 130 may include a volatile and/or nonvolatile memory. The memory 130, for example, may store commands or data related to at least one other element of the electronic device 100. According to an embodiment, the memory 130 may store software and/or a program 140. The program 140, for example, may include a kernel 141, middleware 143, an application programming interface (API) 145, and/or an application program (or an application) 147. At least some of the kernel 141, the middleware 143, or the API 145 may be referred to as an operating system (OS).

The kernel 141, for example, may control or manage system resources (for example, the bus 110, the processor 120, and the memory 130) that are used to execute operations or functions implemented in the other programs (for example, the middleware 143, the API 145, or the applications 147). The kernel 141 may provide an interface through which the middleware 143, the API 145, or the applications 147 access individual elements of the electronic device 100 to control or manage the system resources.

The middleware 143, for example, may function as an intermediary that allows the API 145 or the applications 147 to communicate with the kernel 141 to exchange data.

The middleware 143 may process one or more work requests received from the application programs 147, according to their priorities. For example, the middleware 143 may give a priority, by which a system resource (for example, the bus 110, the processor 120, or the memory 130) of the electronic device 100 may be used, to at least one of the application programs 147. For example, the middleware 143 may perform scheduling or load balancing for the one or more work requests by processing the one or more work requests according to the priority given to the at least one of the application programs 1047.

The API 145 is an interface used, by the application 147, to control a function provided by the kernel 141 or the middleware 143, and may include, for example, at least one interface or function (for example, an instruction), for example, for file control, window control, image processing, and text control.

The input/output interface 150, for example, may function as an interface that may transfer commands or data that are input from the user or another external device to another element(s) of the electronic device 100. The input/output interface 150 may output commands or data received from another element(s) of the electronic device to the user or anther external device 100.

The display 160, for example, may include a liquid crystal display (LCD), a light emitting diode (LED) display, an organic light emitting diode (OLED) display, a microelectromechanical system (MEMS) display, or an electronic paper display. The display 160, for example, may display various contents (for example, a text, an image, a video, an icon, and a symbol). The display 160 may include a touch screen and receive, for example, a touch, a gesture, a proximity, or a hovering input using an electronic pen or the user's body.

The communication interface 170, for example, may set communication between the electronic device 100 and an external device (for example, a first external electronic device 102, a second external electronic device 104, or a server 106). For example, the communication interface 170 may be connected to a network 162 through a wireless communication or a wired communication to communicate with the external device (for example, the second external electronic device 104 or the server 106).

The wireless communication is, for example, a cellular communication protocol, and, for example, may use at least one of long-term evolution (LTE), LTE-advanced (ATE-A), code division multiple access (CDMA), wideband CDMA (WCDMA), a universal mobile telecommunications system (UMTS), wireless broadband (WiBro), or a global system for mobile communications (GSM). Furthermore, the wireless communication, for example, may include a short range communication 164. The short range communication 164, for example, may include at least one of WI-FI®, BLUETOOTH®, a near field communication (NFC), or a global navigation satellite system (GNSS). The GNSS may include at least one of, for example, a global positioning system (GPS), a global navigation satellite system (GLONASS), a Beidou navigation satellite system (hereinafter, "BEIDOU"), or the European global satellite-based navigation system (or GALILEO), according to an in-use area or a bandwidth. Hereinafter, in the present disclosure, the "GPS" may be interchangeably used with the "GNSS". The wired communication may include at least one of, for example, a universal serial bus (USB), a high definition multimedia interface (HDMI), recommended standard-232 (RS-232), and a plain old telephone Service (POTS). The network 162 may include at least one of communication networks, for example, a computer network (for example, a LAN or a WAN), the Internet, or a telephone network.

The first and second external electronic devices 102 and 104 may be the same or different type devices from the electronic device 100. According to an embodiment, the server 106 may include a group of one or more servers. According to various embodiments of the present disclosure, all or some of the operations executed by the electronic device 100 may be executed by another or a plurality of electronic devices (for example, the first external electronic device 102, the second external electronic device 104, or the server 106). According to an embodiment of the present disclosure, when the electronic device 100 should execute some functions or services automatically or upon request, it may request at least some functions associated with the functions or services from another electronic device (for example, the first external electronic device 102, the second external electronic device 104, or the server 106), in place of or in addition to directly executing the functions or services. The other electronic device (for example, the first external electronic device 102, the second external electronic device 104, or the server 106) may execute a requested function or an additional function, and may transfer the result to the electronic device 100. The electronic device 100 may process the received result directly or additionally, and may provide a requested function or service. To this end, for example, the cloud computing, distributed computing, or client-server computing technologies may be used.

Figure 2:
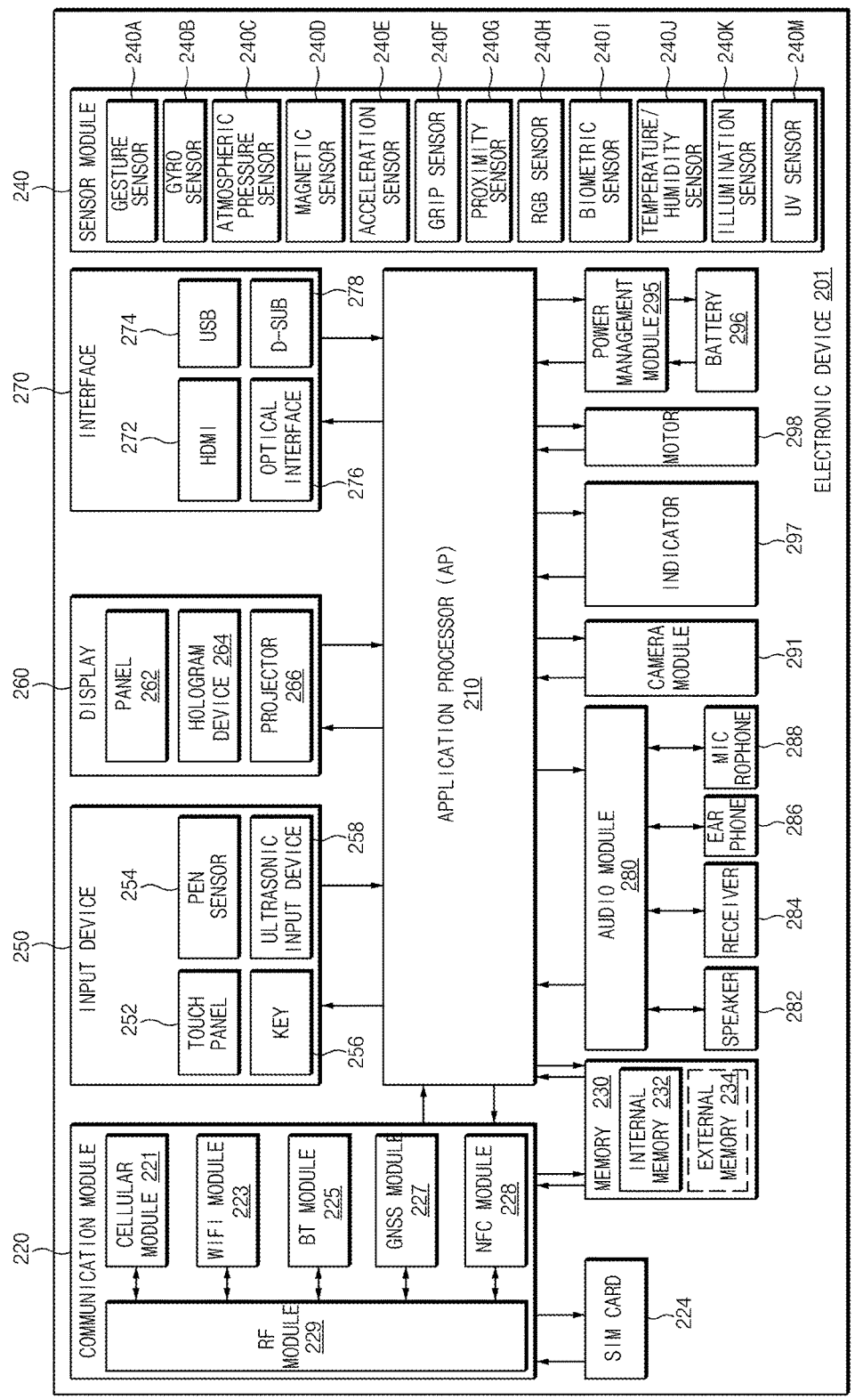
FIG. 2 illustrates an electronic device according to various embodiment of the present disclosure.

FIG. 2 illustrates an electronic device 200 according to various embodiments. An electronic device 200 may include, for example, the entirety or a part of the electronic device 100 illustrated in FIG. 1. Referring to FIG. 200, the electronic device 31 may include at least one processor (for example, an application processor (AP) 210), a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

The processor 210 may control a plurality of hardware or software elements connected to the processor 210 by driving an operating system or an application program and perform a variety of data processing and calculations. The processor 210 may be implemented by, for example, a System on Chip (SoC). According to an embodiment, the processor 210 may further include a graphical processing unit (GPU) and/or an image signal processor. The processor 210 may include at least some (for example, a cellular module 221) of the elements illustrated in FIG. 2. The processor 210 may load instructions or data, received from at least one other element (for example, a non-volatile memory), in a volatile memory to process the loaded instructions or data, and may store various types of data in a non-volatile memory.

The communication module 220 may have the same or similar structure to the communication interface 170 of FIG. 1. The communication module 220 may include, for example, a cellular module 221, a Wi-Fi module 223, a Bluetooth module 225, a GNSS module 227 (for example, a GPS module, a Glonass module, a Beidou module, or a Galileo module), an NFC module 228, and a radio frequency (RF) module 229.

The cellular module 221 may provide a voice call, a video call, a text message service, or an Internet service through, for example, a communication network. According to an embodiment, the cellular module 221 may distinguish between and authenticate electronic devices 200 within a communication network using a subscriber identification module (for example, the SIM card 224). According to an embodiment, the cellular module 221 may perform at least some of the functions that the processor 210 may provide.

According to an embodiment of the present disclosure, the cellular module 221 may include a communication processor (CP).

The Wi-Fi module 223, the BT module 225, the GPS module 227, and the NFC module 228 may include a processor for processing data transmitted/received through the corresponding module. According to some embodiments, at least some (two or more) of the cellular module 221, the Wi-Fi module 223, the Bluetooth module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amp Module (PAM), a frequency filter, a Low Noise Amplifier (LNA), or an antenna. According to another embodiment, at least one of the cellular module 221, the Wi-Fi module 223, the Bluetooth module 225, the GNSS module 227, or the NFC module 228 may transmit and receive an RF signal through a separate RF module.

The subscriber identification module 224 may include, for example, a card including a subscriber identification module and/or an embedded SIM, and may further include unique identification information (for example, an integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may include at least one of, for example, a volatile memory (for example, a dynamic random access memory (DRAM), a static RAM (SRAM), a synchronous dynamic RAM (SDRAM), and the like) and a non-volatile memory (for example, a one time programmable read only Memory (OTPROM), a programmable ROM (PROM), an erasable and programmable ROM (EPROM), an electrically erasable and programmable ROM (EEPROM), a flash memory (for example, a NAND flash memory or a NOR flash memory), a hard driver, or a solid state drive (SSD).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), or a memory stick. The external memory 234 may be functionally and/or physically connected to the electronic device 200 through various interfaces.

The sensor module 240 may measure, for example, a physical quantity or detect an operation state of the electronic device 200, and may convert the measured or detected information to an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a biometric sensor 240I, a temperature/humidity sensor 240J, an illumination sensor 240K, and a Ultra Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 200 may further include a processor configured to control the sensor circuit 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. The touch panel 252 may further include a control circuit. The touch panel 252 may further include a tactile layer, and provide a tactile reaction to a user.

The (digital) pen sensor 254 may include, for example, a recognition sheet which is a part of the touch panel or a separate recognition sheet. The key 256 may include, for example, a physical button, an optical key, or a keypad. The ultrasonic input device 258 may detect ultrasonic waves generated by an input tool through a microphone (for example, a microphone 288) and may identify data corresponding to the detected ultrasonic waves.

The display 260 (for example, the display 160) may include a panel 262, a hologram device 264, or a projector 266. The panel 262 may include an element equal or similar to the display 160 of FIG. 1. The panel 262 may be implemented to be, for example, flexible, transparent, or wearable. The panel 262 may be formed as a single module together with the touch panel 252. The hologram device 264 may show a three dimensional image in the air using an interference of light. The projector 266 may display an image by projecting light onto a screen. The screen may be located, for example, in the interior of or on the exterior of the electronic device 200. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the input/output interface 150 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, an LED or xenon lamp).

The power management module 295 may manage, for example, power of the electronic device 200. According to an embodiment of the present disclosure, the power management module 295 may include a Power Management Integrated Circuit (PMIC), a charger Integrated Circuit (IC), or a battery or fuel gauge. The PMIC may have a wired and/or wireless charging scheme. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may indicate particular status of the electronic device 200 or a part thereof (for example, the processor 210), for example, a booting status, a message status, a charging status, or the like. The motor 298 may convert an electrical signal into mechanical vibrations, and may generate a vibration or haptic effect. Although not illustrated, the electronic device 200 may include a processing device (for example, a GPU) for supporting mobile TV. The processing unit for supporting mobile TV may process, for example, media data pursuant to a certain standard of Digital Multimedia Broadcasting (DMB), Digital Video Broadcasting (DVB), or media flow (MEDIAFLO™).

Each of the elements described in the specification may include one or more components, and the terms of the elements may be changed according to the type of the electronic device. In various embodiments of the present disclosure, the electronic device may include at least one of the elements described in the specification, and some elements may be omitted or additional elements may be further included. Some of the elements of the electronic device according to various embodiments may be coupled to form one entity, and may perform the same functions of the corresponding elements before they are coupled.

Figure 3:
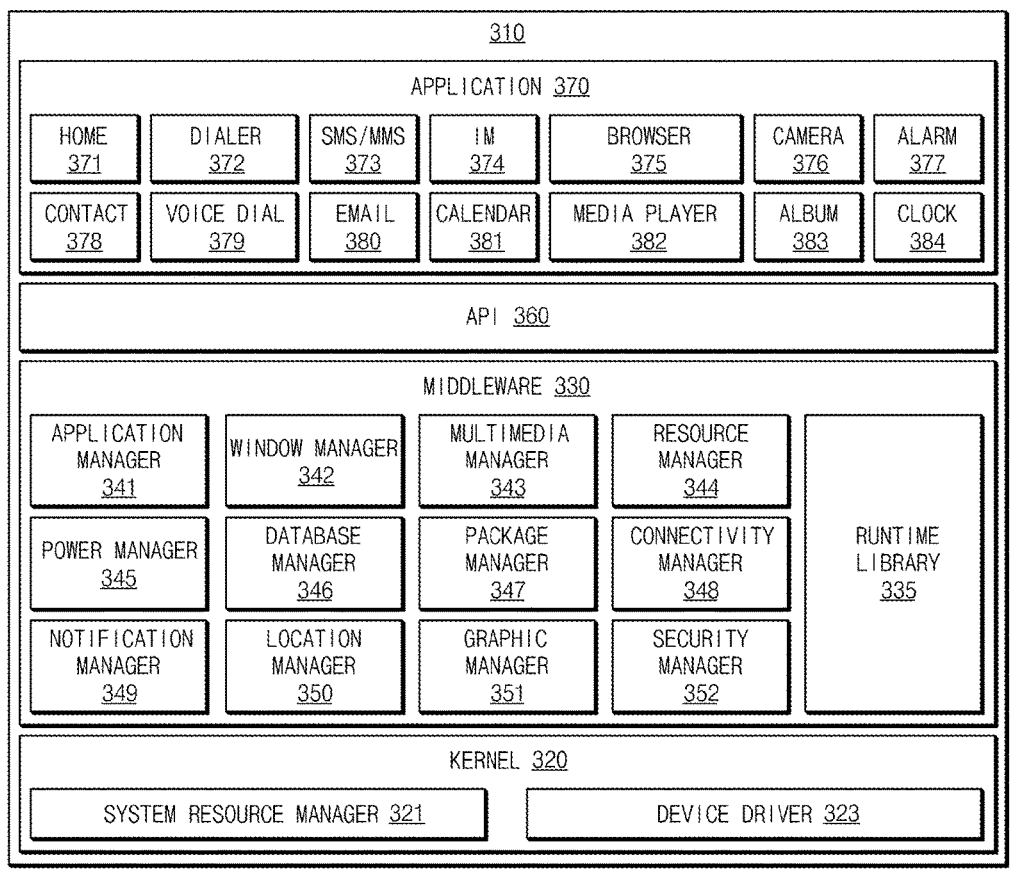
FIG. 3 illustrates a program module according to various embodiments of the present disclosure.

FIG. 3 illustrates a program module according to various embodiments. According to an embodiment, the program module 310 (for example, a program 140) may include an operating system (OS) that controls resources related to an electronic device 100, and various application programs (for example, an application program 147) that is driven on an operating system. The operating system may be, for example, ANDROID®, iOS®, WINDOWS®, SYMBIAN®, TIZEN®, SAMSUNG BADA®, or the like.

The program module 310 may include a kernel 320, a middleware 330, an application programming interface (API) 360, and/or applications 370. At least a part of the program module 310 may be preloaded on an electronic device or may be downloaded from external electronic devices (for example, first and second external electronic devices 102 and 104 and a server 106).

The kernel 320 (for example, the kernel 141) may include, for example, a system resource manager 321 and/or a device driver 323. The system resource manager 321 may control, allocate, or retrieve the system resources. According to one embodiment, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources of the electronic device. According to an exemplary embodiment, the middleware 330 (for example, the middleware 143) may include, for example, at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The run time library 335 may include, for example, a library module that a compiler uses in order to add new functions through a programming language while the applications 370 are executed. The run time library 335 may perform input/output management, memory management, or a function for an arithmetic function.

The application manager 341, for example, may manage a lifecycle of at least one of the applications 370. The window manager 342 may manage a GUI resource used in a screen. The multimedia manager 343 may detect a format required for reproducing various media files and encode or decode a media file using a codec appropriate for the corresponding format. The resource manager 344 may manage resources, such as a source code, a memory, or a storage space, of at least one of the applications 370.

The power manager 345 may operate together with, for example, a Basic Input/Output System (BIOS), so as to manage a battery or power and may provide power information required for the operation of the electronic device. The database manager 346 may generate, search for, or change a database to be used by at least one of the applications 370. The package manager 347 may manage the installation or the updating of applications distributed in a package file form.

For example, the connectivity manager 348 may manage wireless connections, such as Wi-Fi or Bluetooth. The notification manager 349 may display or notify an event such as a received message, an appointment, a proximity notification, and the like to a user without disturbance. The location manager 350 may manage location information of the electronic device. The graphic manager 351 may manage graphic effects to be provided to a user and user interfaces related to the graphic effects. The security manager 352 may provide various security functions required for system security or user authentication. According to an embodiment of the present disclosure, when the electronic device (for example, the electronic device 100) has a phone function, the middleware 330 may further include a telephony manager for managing a voice or video communication function of the electronic device.

The middleware 330 may include a middleware module for forming a combination of various functions of the aforementioned elements. The middleware 330 may provide modules specialized according to the type of OS in order to provide differentiated functions. In addition, some existing elements may be dynamically removed from the middleware 330, or new elements may be added to the middleware 330.

The API 360 (for example, the API 145) is, for example, a set of API programming functions, and may be provided another configuration according to an operating system. For example, for each platform, one API set may be provided in a case of ANDROID® or iOS®, and two or more API sets may be provided in a case of TIZEN®.

The application 370 (for example, the application program 147) may include, for example, a home 371, a dialer 372, an SMS/MMS 373, an instant message (IM) 374, a browser 375, a camera 376, an alarm 377, a contact 378, a sound dial 379, an e-mail 380, a calendar 381, a media player 382, an album 383, a clock 384, or at least one application that may provide health care (for example, measuring an exercise degree or blood glycose) or environmental information.

According to an embodiment, the application 370 may include an application (hereinafter, referred to as "an information exchange application for convenience of description")

that supports exchange of information between the electronic device (for example, the electronic device 100) and other electronic devices (for example, the first external electronic device 102 and the second external electronic device 104). The information exchange application may include, for example, a notification relay application for forwarding specific information to an external electronic device, or a device management application for managing an external electronic device.

For example, the notification relay application may have a function of forwarding, to other electronic devices (for example, the first external electronic device 102 and the second external electronic device 104), notification information generated from other applications of the electronic device 10 (for example, an SMS/MMS application, an e-mail application, a health care application, and an environmental information application). The notification relay application may receive notification information from, for example, an external electronic device and provide the received notification information to a user.

The device management application may, for example, manage (for example, install, delete, or update) a function for at least a part of an external electronic device (for example, the first external electronic device 102 and the second external electronic device 104) communicating with the electronic device 10 (for example, activating/deactivating the external electronic device itself (or some components thereof) or adjusting the brightness (or resolution) of a display), an application operating in the external electronic device, or a service provided from the external electronic device (for example, a telephone call service or a message service).

According to an embodiment, the application 370 may include an application (for example, a health management application) designated according to an attribute of another device (for example, the first external electronic device 102 and the second external electronic device 104). According to an embodiment, the application 370 may include an application that is received from an external electronic device (for example, the first external electronic device 102, the second external electronic device 104, or the server 106). According to an embodiment of the present disclosure, the applications 370 may include a preloaded application or a third party application that is downloaded from a server. The names of the elements of the program module 310 according to the illustrated embodiment may vary according to the type of the operating system.

According to various embodiments, at least a part of the program module 310 may be implemented by software, firmware, hardware, or two or more combinations thereof. At least a part of the program module 310, for example, may be implemented (for example, executed) by a processor (for example, the processor 210). At least a part of the program module 310 may include, for example, a module, a program routine, a set of instructions, or a process for performing at least one function.

Figure 4A:
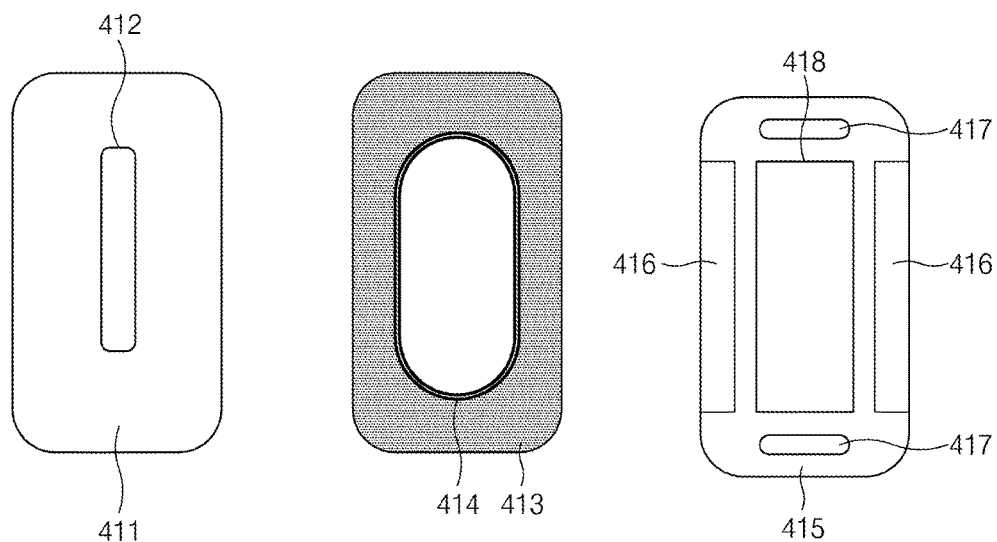
FIG. 4A illustrates a receiver according to various embodiments of the present disclosure.
Figure 4B:
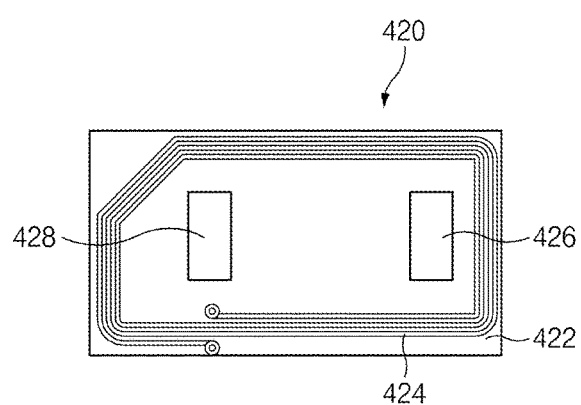
FIG. 4B illustrates an antenna according to various embodiments of the present disclosure.

FIG. 4A illustrates a receiver according to various embodiments of the present disclosure. FIG. 4B illustrates an antenna according to various embodiments of the present disclosure. FIG. 4A illustrates components included in the receiver 410, and FIG. 4B illustrates the antenna pattern 424 that will be attached to a rear surface of the receiver 410.

The receiver 410, for example, may be configured to act as a speaker that delivers a voice of a counter part to the user when a call is received and transmitted by using an electronic device. The receiver 410 may include an upper plate 411, a vibration plate 413, and a lower plate 415. The receiver 410 may have a structure in which the upper plate 411, the vibration plate 413, and the lower plate 415 are stacked. The upper plate 411 may be situated on a front surface of the receiver 410, and may include a front radiation hole 412. The upper plate 411 may be included in the vibration plate 413 that includes a voice coil 414. Further the vibration plate 413 may be positioned on the lower plate 415, and in this case, two permanent magnets 416 may surround the voice coil 414. Further, a permanent magnet 418 may be further situated between two rear radiation holes 417 in the lower plate 415. The voice coil 414 may pass a sound source signal that is delivered from the outside, and a magnetic field generated when the sound source signal passes through the voice coil 414 may move the voice coil 414 upwards and downwards due to the permanent magnets 416 and/or the permanent magnet 418. Through this, the vibration plate 413 attached to the voice coil 414 may be move upwards and downwards together with the voice coil 414, and may vibrate air particles to generate a sound. The generated sound may be delivered to a user through a front radiation hole 412 situated in the upper plate 411 and the two rear radiation holes 417 situated in the lower plate 415. The rear radiation holes 417 of the receiver 410 may be disposed at locations corresponding to the radiation holes 426 and 428 of FIG. 4B, respectively.

An antenna 420 may be implemented through an antenna pattern 424 mounted a printed circuit board (PCB) 422. According to various embodiments of the present disclosure, the printed circuit board 422 may be replaced by a flexible printed circuit board (FPCB). According to various embodiments of the present disclosure, the antenna 420 may perform communication with the outside to transmit and receive data. The antenna 420, for example, may be used in near field communication (NFC) or magnetic secure transfer (MST) communication, and for an antenna for wireless charging. According to an embodiment, the antenna pattern 424 may have a form of a loop.

According to an embodiment, the printed circuit board 422 may be a mono-layered PCB or a multi-layered PCB. When the printed circuit board 422 is a multi-layered PCB, the antenna pattern 424 may be situated on a surface layer of the printed circuit board 422 but also may be situated in an intermediate part of a multi-layer.

According to an embodiment, the antenna 420 of FIG. 4B may be positioned on a rear surface of the receiver 410. For example, one surface of the printed circuit board 422 may face the lower plate 415. Further, according to various embodiments of the present disclosure, the printed circuit board 422 may replace the lower plate 415, and in this case, two permanent magnets 416 and a permanent magnet 418 may be seated on one surface of the printed circuit board 422.

According to various embodiments of the present disclosure, the printed circuit board 422 may include radiation holes 426 and 428. The radiation holes 426 and 428 may be holes for delivering a sound to the user. A sound is generated while a vibrator within the receiver vibrates upwards and downwards, and then the radiation holes 426 and 428 are holes through which a sound is emitted when the vibrator vibrates downwards and may be associated with low frequency band characteristics.

According to various embodiments of the present disclosure, a front surface (the upper plate 411) of the receiver 410 may face the front surface of the electronic device, and a rear surface (the lower plate 415) of the receiver 410 may face the rear surface of the electronic device. Accordingly, the rear surface of the electronic device may perform communication (for example, short range communication) through the antenna 420.

According to various embodiments of the present disclosure, when the receiver 410 is situated at an upper end of the electronic device, an upper end of the electronic device may perform communication through the antenna 420.

According to an embodiment, the antenna 420 may be an NFC antenna. The NFC communication circuit that performs communication through the NFC antenna may be operated in a card emulation mode, a read/write mode, and a P2P mode.

A controller of the NFC communication circuit may control an NFC communication circuit such that the NFC communication circuit is operated in response to an operation mode received a processor. For example, if a signal for one communication mode of a card emulation mode, a read/write mode, and a P2P mode is delivered from the processor, the controller may control the NFC communication circuit such that the NFC communication may perform a corresponding operation.

According to various embodiments of the present disclosure, the card emulation mode may perform an operation of transmitting information stored in a security device to an external reader (not illustrated). For example, the card emulation mode may be used when a payment function, a transportation card function, or a function related to a user authentication, for example, of an ID card is performed. In the read/write mode, an operation for reading external tag information or writing specific information in the external tag information may be performed. In the P2P mode, data may be exchanged between devices. The data, for example, may include an electronic name card, contact address information, a digital photo, and a URL address.

According to an embodiment, the antenna 420 of FIG. 4B may be used in the card emulation mode. For example, if the user takes a rear surface of an upper end of the electronic device to an NFC reader, a card payment may be performed.

Referring to FIG. 4B, although it is illustrated that the antenna pattern 424 is arranged on an uppermost layer of the printed circuit board 422, according to various embodiments, the printed circuit board 422 may be a multi-layered printed circuit board and the antenna pattern 424 may be situated in an intermediate layer of the printed circuit board 422. Further, according to various embodiments of the present disclosure, the antenna pattern 424 may be arranged in two or more layers of the printed circuit board 422.

Figure 4C:
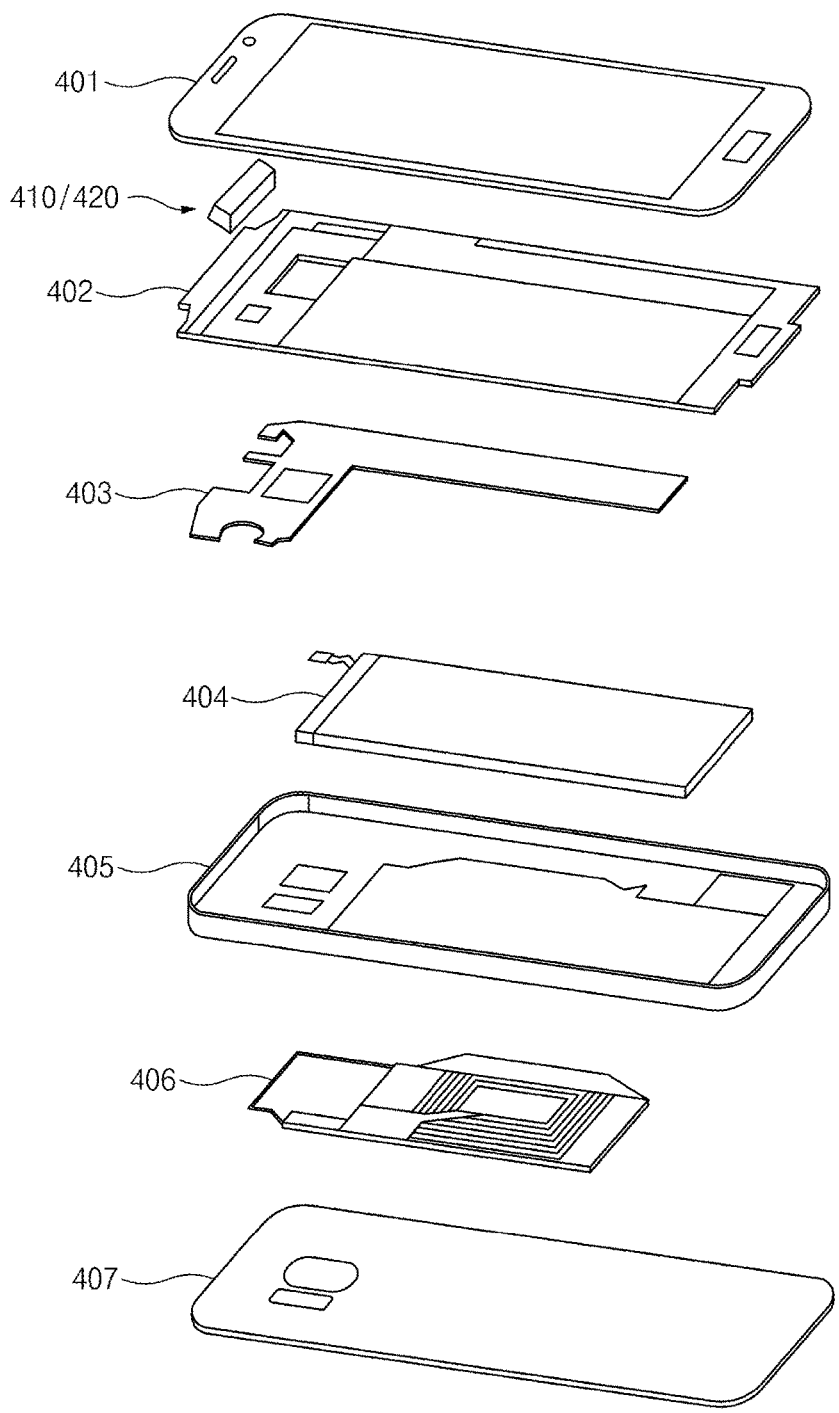
FIG. 4C illustrates an exploded perspective view of an electronic device according to various embodiments of the present disclosure.

FIG. 4C illustrates an exploded perspective view of an electronic device according to various embodiments of the present disclosure. The electronic device may include an external front glass member 401 that may include a display, a receiver 410 that may include an antenna 420, a front housing 402, a printed circuit board 403, a battery 404, a rear housing 405, a coil antenna 406, and an external rear glass member 407.

The coil antenna 406 may include at least one of a magnetic secure transmission (MST) antenna, a near field communication (NFC) antenna, and a wireless power consortium (WPC) antenna.

Figure 5:
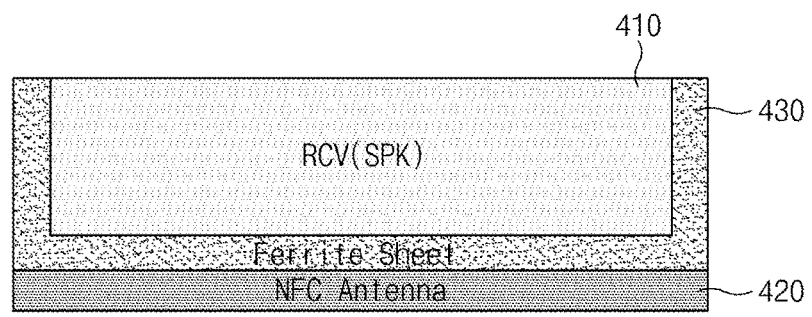
FIG. 5 illustrates a sectional view illustrating a state in which a receiver and an antenna are coupled to each other according to various embodiments of the present disclosure.

FIG. 5 illustrates a sectional view illustrating a state in which a receiver and an antenna are coupled to each other according to various embodiments of the present disclosure.

According to an embodiment, the antenna 420 may be coupled to the rear surface of the receiver 410. For example, the rear surface of the printed circuit board 422 may be coupled to the rear surface of the receiver 410 while facing each other.

According to an embodiment, the antenna 420 may be a loop antenna, and a wire loop constituting the loop antenna may be operated as an inductor. For example, a first loop antenna is adjacent to a second loop antenna, an induced current may be generated in the second loop antenna. For example, when an electronic device provided with an NFC antenna is situated within an effective distance, the NFC reader may induce a magnetic field through a loop antenna of the NFC reader. Further, the induced magnetic field may induce a current in the NFC antenna of the electronic device, and the electronic device may perform NFC communication with the NFC reader by reading the induced current.

According to an embodiment, the antenna may be disposed adjacent to a conductive material. For example, the conductive material may be the permanent magnets 416 and 418 of FIG. 4A. The conductive material may reduce an inductance of the loop antenna, and may induce an eddy current. The generated eddy current may generate a magnetic field in a specific direction, which disturbs a magnetic field between the NFC reader and the NFC antenna. For example, a magnetic field in an opposite direction may lower a performance of the NFC.

According to an embodiment, a space may be provided between the antenna 420 and the permanent magnets 416 and 418 to prevent degradation of a performance of the NFC or a fail of the NFC. For example, in the case of 13.56 MHz, if a free space of 2 to 3 cm is provided between the antenna 420 and the permanent magnets 416 and 418, degradation of a performance of the NFC or a fail of the NFC may be prevented.

According to an embodiment, a shielding sheet 430 that shields the eddy current may be provided between the receiver 410 and the antenna 420. The shielding sheet 430 is a magnetic plate having a high magnetic permeability, and is situated between the antenna 420 and the permanent magnets 416 and 418 to increase an effective distance between the antenna 420 and the permanent magnets 416 and 418. Accordingly, a magnetic field between the NFC reader and the antenna 420 may be introduced into the antenna 420 without being disturbed by a magnetic field in an opposite direction. The shielding sheet 430 may prevent a magnetic saturation by a strong magnetic field generated by a magnet in the receiver 410 during an operation of a magnetic field of the antenna 420. In a magnetic saturation state, data communication cannot be performed due to a saturated magnetic field instead of a normal change of a magnetic field.

The shielding sheet 430 according to various embodiments of the present disclosure may include a flexible wave absorber of a polymer type or a ferrite sheet.

Figure 6:
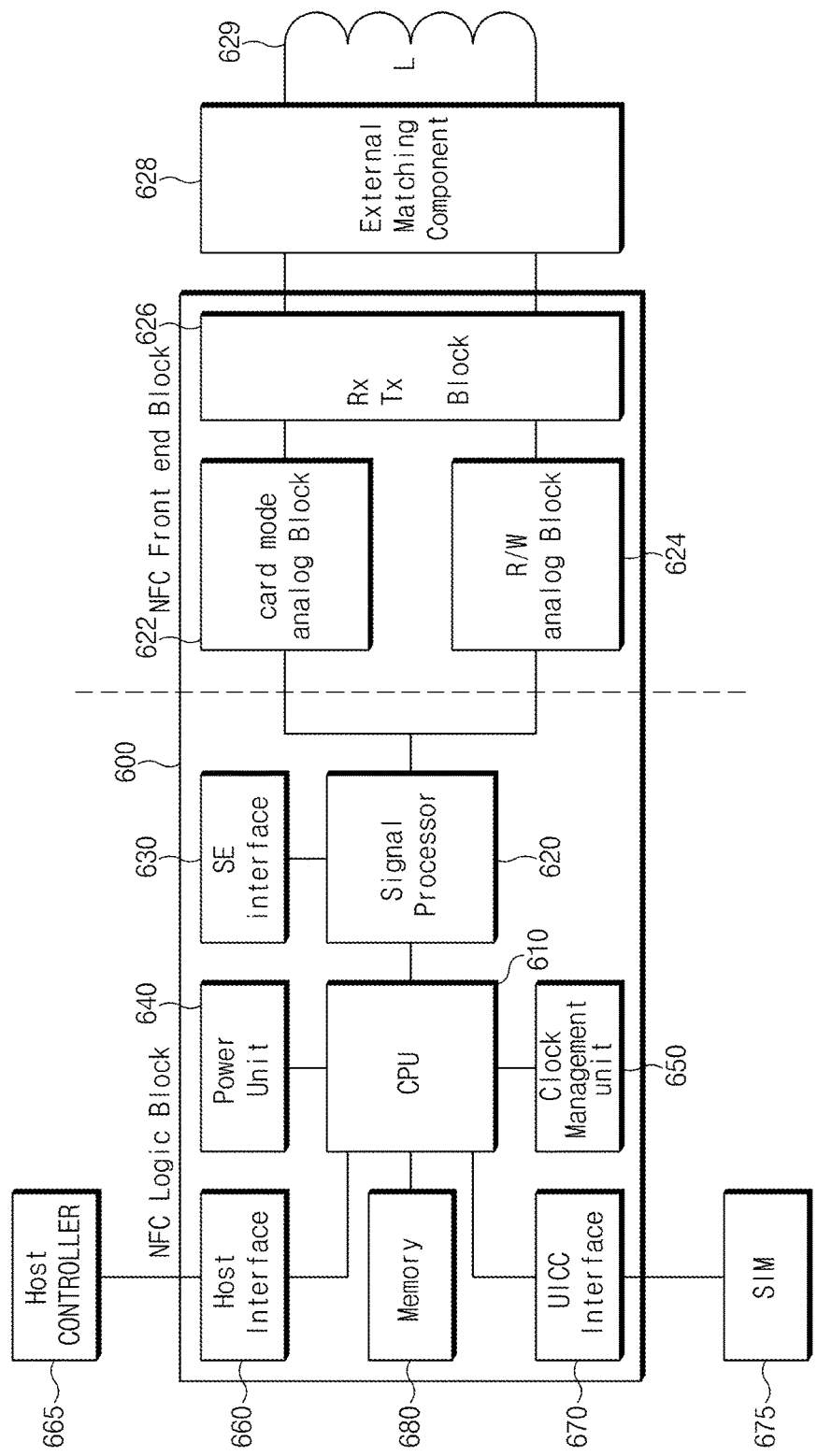
FIG. 6 illustrates an electronic device according to various embodiments of the present disclosure.

FIG. 6 illustrates a communication block diagram of an electronic device according to various embodiments of the present disclosure. Referring to FIG. 6, an NFC communication circuit 600 may include a processor (CPU) 610, a signal processor 620, a card mode analog block 622, a read/write mode analog block 624, a signal transmission/reception block 626, an SE interface 630, a power management unit 640, a clock management unit 650, a host interface 660, a UICC interface 670, and a memory 680.

According to various embodiments of the present disclosure, the processor (CPU) 610, the signal processor 620, a card, an SE interface 630, the power management unit 640, the clock management unit 650, the host interface 660, the UICC interface 670, and the memory 680 may be classified as NFC logic blocks, and the card mode analog block 622, the read/write mode analog block 624, and the signal transmission/reception block 626 may be classified as front end blocks. The NFC front end block may be connected to an external matching circuit 628 and an antenna 629 to perform communication.

The NFC communication circuit 600 may receive a control signal from the host controller 665 through the host interface 660 to perform NFC communication. For example, the processor 610 may determine whether the NFC communication circuit 600 will be operated in a card mode or a read/write mode, based on a control signal received from the host controller 665. Further, the processor 610 may operate the card mode analog block 622 or the read/write mode analog block 624 through the signal processor 620, based on the determined mode.

Figure 7A:
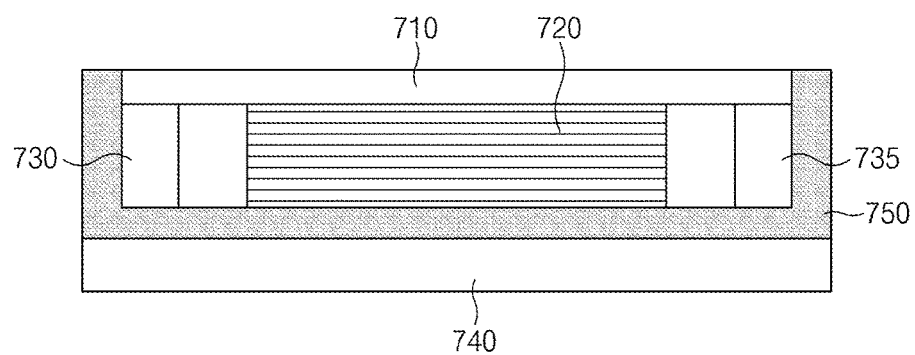
FIG. 7A illustrates a section of a receiver according to various embodiments of the present disclosure.
Figure 7B:
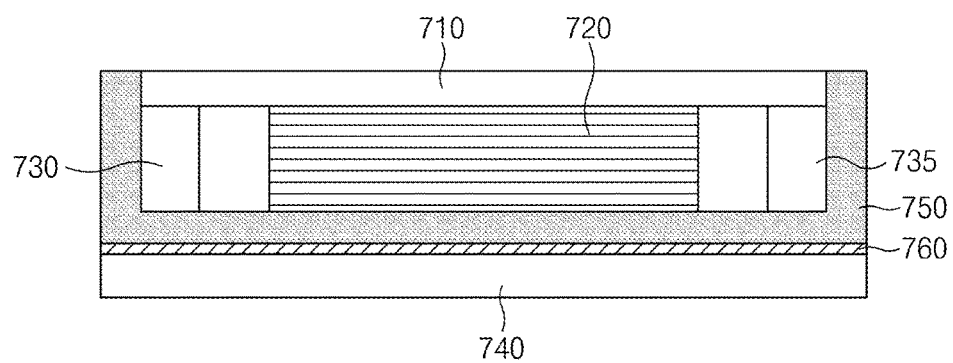
FIG. 7B illustrates a section of a receiver according to various embodiments of the present disclosure.
Figure 7C:
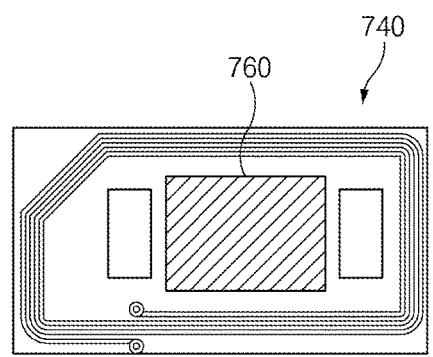
FIG. 7C illustrates a section of a receiver according to various embodiments of the present disclosure.

FIGS. 7A and 7B illustrate a section of a receiver according to various embodiments of the present disclosure. FIG. 7C illustrates a section of a receiver according to various embodiments of the present disclosure.

The receiver of FIG. 7A includes a piezoelectric plate 710, a voice coil 720, permanent magnets 730 and 735, and an antenna 740. The piezoelectric plate 710 may correspond to the upper plate 411 of FIG. 4A. As described with reference to FIG. 4A, the piezoelectric plate 710 is attached to the voice coil 720, and a magnetic field generated by a signal provided to the voice coil 720 may vibrate the voice coil 720 forwards and rearwards due to the permanent magnets 730 and 735. Although not illustrated in FIG. 7A, another permanent magnet may be further provided inside the voice coil 720 to vibrate the voice coil 720 forwards and rearwards. Accordingly, the piezoelectric plate 710 attached to the voice coil 720 may vibrate forwards and rearwards together with the voice coil 720. Although not illustrated in FIG. 7A, the antenna 740 may include radiation holes (for example, 426 and 428 of FIG. 4B).

The antenna 740 according to various embodiments of the present disclosure may function to support a receiver or function as a heat sink plate that cools heat generated by the receiver.

According to an embodiment, the antenna 740 may include a loop antenna pattern that is mounted on a printed circuit board (PCB) or a flexible printed circuit board (FPCB). Further, the printed circuit board (PCB) or the flexible printed circuit board (FPCB) may function to support the receiver.

According to an embodiment, the shielding sheet 750 may be adapted to shield an eddy current and a magnetic flux saturation phenomenon generated by the permanent magnets 730 and 735.

Referring to FIG. 7B, according to various embodiments of the present disclosure, a copper plate 760 may be provided between the antenna 740 and the shielding sheet 750. The copper plate 760 may be used as a heat sink plate. Copper does not influence a radiator, and the copper plate 760 may have a shape that does not consider an antenna pattern (for example, the antenna pattern 424).

According to various embodiments of the present disclosure, the copper plate 760 may be disposed between the antenna 740 and the shielding sheet 750 as a whole, and may be disposed only in an area. For example, the copper plate 760 may be disposed between the antenna 740 and the shielding sheet 750 while having a size corresponding to the antenna 740. Further, referring to FIG. 7C, the copper plate 760 may be disposed between the radiation holes (for example, 426 and 428 of FIG. 4). As illustrated in FIG. 7C, the copper plate 760 of FIG. 7C may have a size corresponding to only an area of the antenna 740.

Figure 8:
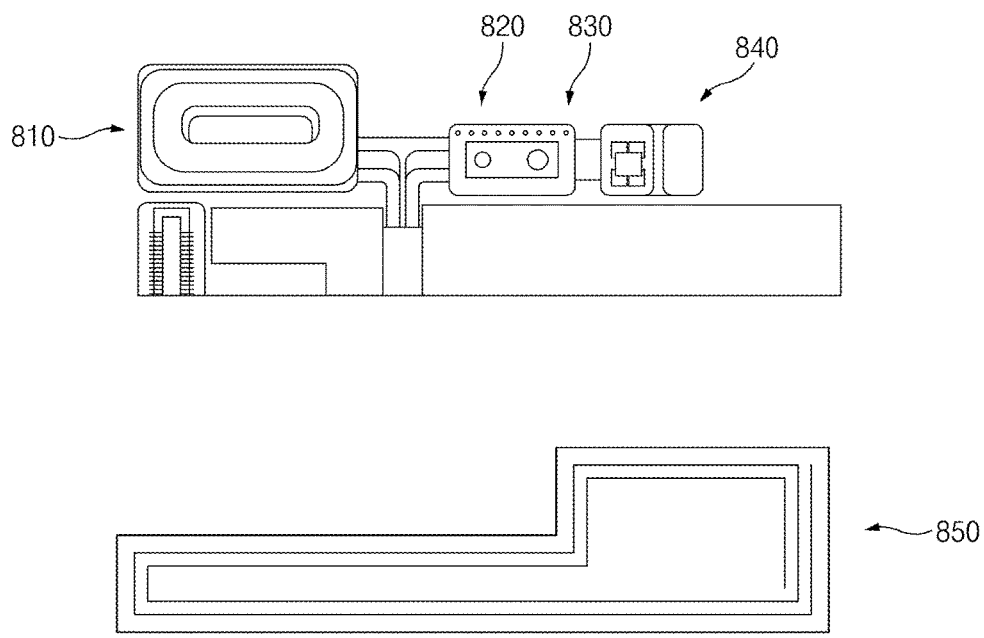
FIG. 8 illustrates a receiver, a proximity sensor, an illumination sensor, and a service LED, an antenna, and a service LED included in an electronic device according to various embodiments of the present disclosure.

FIG. 8 illustrates a receiver, a proximity sensor, an illumination sensor, and a service LED, or an antenna included in an electronic device according to various embodiments of the present disclosure.

The drawing illustrated at an upper end of FIG. 8 illustrates a receiver 810, a proximity sensor 820, an illumination sensor 830, and a service LED 840. The drawing illustrated at an upper end of FIG. 8 may be disposed in a direction that faces a front surface of the electronic device.

The receiver 810 may be a speaker for listening to a voice of a counterpart who receives and transmits a call. Further, the proximity sensor 820 may determine whether an object is near the electronic device. The illumination sensor 830 may measure brightness of an environment that surrounds the electronic device. The service LED 840 may be an indicator that informs the user of generation of a specific event by emitting light.

The drawing illustrated at a lower end of FIG. 8 illustrates an antenna 850. According to an embodiment, the antenna 850 may be implemented by a loop antenna pattern mounted on a printed circuit board or a flexible printed circuit board.

According to various embodiments of the present disclosure, the antenna 850 may be situated on rear surfaces of the receiver 810, the proximity sensor 820, the illumination sensor 830, and the service LED 840 illustrated at an upper end of FIG. 8. For example, the rear surface of the antenna 850 may be coupled to the rear surfaces of the receiver 810, the proximity sensor 820, the illumination sensor 830, and the service LED 840.

According to an embodiment, the receiver 810 may be situated at an upper end of the electronic device. Further, the proximity sensor 820, the illumination sensor 830, and the service LED 840 may be also situated at an upper end of the electronic device. As the antenna 850 faces the rear surface of the electronic device, the user may perform communication through a rear surface of an upper end of the electronic device.

Although FIG. 8 illustrates that the antenna 850 is situated over the receiver 810, the proximity sensor 820, the illumination sensor 830, and the service LED 840, according to various embodiments of the present disclosure, the location and the size of the antenna may be variously determined. For example, the antenna may be situated only over the proximity sensor 820, the illumination sensor 830, and the service LED 840, but may be situated only over the illumination sensor 830 and the service LED 840.

According to various embodiments of the present disclosure, an antenna may be attached to a structure that is situated at an upper end of the electronic device. Various embodiments of the present disclosure are not limited to an example in which an antenna is applied to an upper end of the electronic device. For example, the antenna may be attached to a rear surface of a structure, such as a speaker unit or a home button, which is situated at a lower end of the electronic device in advance to perform various embodiments of the present disclosure.

Figure 9:
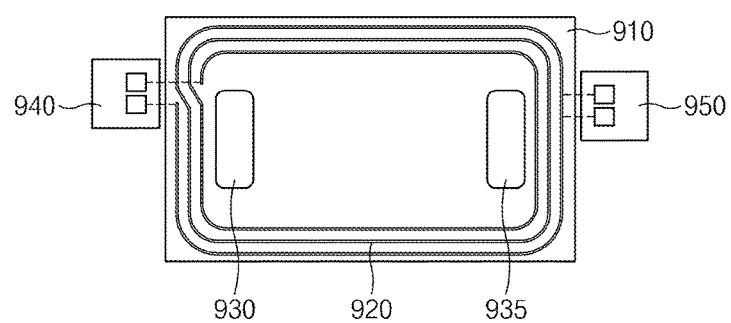
FIG. 9 illustrates an antenna and an expansion pad connected to the antenna according to various embodiments of the present disclosure.

FIG. 9 is a view illustrating an antenna and an expansion pad connected to the antenna according to various embodiments of the present disclosure.

According to an embodiment, the antenna may include an antenna pattern 920 arranged on a printed circuit board or a flexible printed circuit board 910. Further, radiation holes 930 and 935 may be included in a printed circuit board or a flexible printed circuit board 910.

According to an embodiment, the antenna may include expansion pads 940 and 950 connected to the antenna pattern 920. The expansion pads 940 and 950 may be a connection port for various configurations, such as another communication antenna and a communication circuit (for example, an NFC communication circuit), which may be connected to the antenna pattern 920.

According to various embodiments of the present disclosure, the expansion pad 940 may be connected to a feeding part for the antenna pattern 920, and the expansion pad 950 may be connected to the other communication antenna and the communication circuit, which have been mentioned above.

Figure 10A:
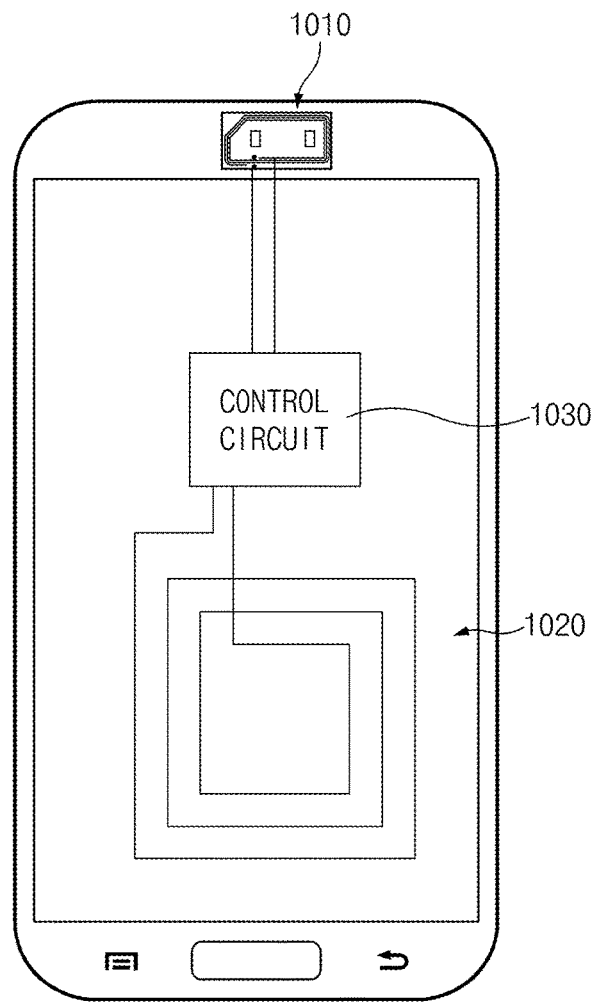
FIG. 10A illustrates an electronic device including a first antenna, a second antenna, and a control circuit according to various embodiments of the present disclosure.

FIG. 10A illustrates an electronic device including a first antenna, a second antenna, and a control circuit according to various embodiments of the present disclosure.

Referring to FIG. 10A, the electronic device may include a first antenna 1010, a second antenna 1020, and a control circuit 1030. In FIG. 10, the first antenna 1010 and the second antenna 1020 may face a rear surface of the electronic device.

According to various embodiments of the present disclosure, the second antenna 1020 may be mounted on an FPCB or a PCB. Further, the second antenna 1020 may be mounted on a structure included in the electronic device, for example, a battery. According to various embodiments of the present disclosure, the control circuit 1030 and the first antenna 1010 or the second antenna 1020 may be connected to each other through an FPCB, a PCB, a metal housing, or a structure of the electronic device.

The control circuit 1030 according to various embodiments of the present disclosure, for example, may perform communication through an NFC antenna. For example, the control circuit 1030 may operate the first antenna 1010 or the second antenna 1020 in a card emulation mode, a read/write mode, and a P2P mode.

When the electronic device approach an NFC terminal, the control circuit 1030, for example, may recognize a magnetic field generated by the NFC terminal, and may perform a payment through the first antenna 1010 based on the recognized magnetic field. Further, when recognizing the NFC tag, the control circuit 1030 may read information stored in an NFC tag through the second antenna 1020. Further, when the user selects a file, which will be transmitted, to perform NFC communication, the control circuit 1030 may transmit the selected file to the outside through the second antenna 1020.

According to various embodiments of the present disclosure, the control circuit 1030 may be an NFC communication circuit (a controller), the first antenna 1010 may be an NFC antenna for a card emulation card, and the second antenna 1020 may be an NFC antenna for a read/write mode and a P2P mode.

The control circuit 1030 may be a processor, or may be operated in a corresponding mode based on a control signal related to an NFC operation mode, which has been received from a processor (not illustrated).

Figure 10B:
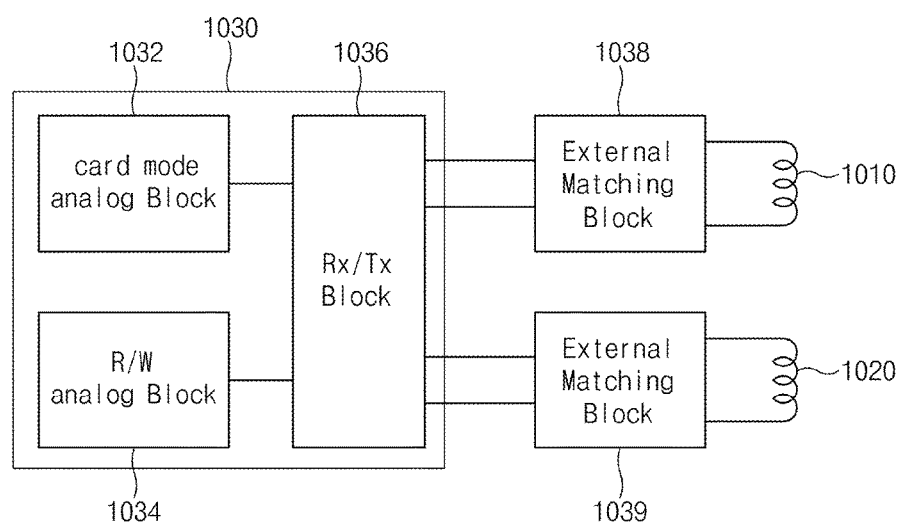
FIG. 10B illustrates a configuration of the control circuit, the first antenna, and the second antenna of FIG. 10A according to various embodiments of the present disclosure.

FIG. 10B illustrates a configuration of the control circuit, the first antenna, and the second antenna of FIG. 10A according to various embodiments of the present disclosure.

According to an embodiment, the control circuit 1030 may include a card emulation mode circuit 1032, a read/write mode circuit 1034, and a signal transmission/reception circuit 1036. The first antenna 1010 may be connected to the signal transmission/reception circuit 1036 through a matching circuit 1038, and the second antenna 1020 may be connected to the signal transmission/reception circuit 1036 through the matching circuit 1039. When the antenna is used in a card emulation mode, the card emulation mode circuit 1032 may be operated. When the antenna is used in a read/write mode (or a P2P mode), the read/write mode circuit 1034 may be operated. The matching circuits 1038 and 1039 may be designed such that the first antenna 1010 and the second antenna 1020 are operated at individually intended frequency bands.

Although FIG. 10B illustrates that the control circuit 1030 includes only the card emulation mode circuit 1032, the read/write mode circuit 1034, and the signal transmission/reception circuit 1036, the control circuit 1030 may further include a CPU, a signal processor, a power unit, or a memory for performing communication through an antenna.

Figure 10C:
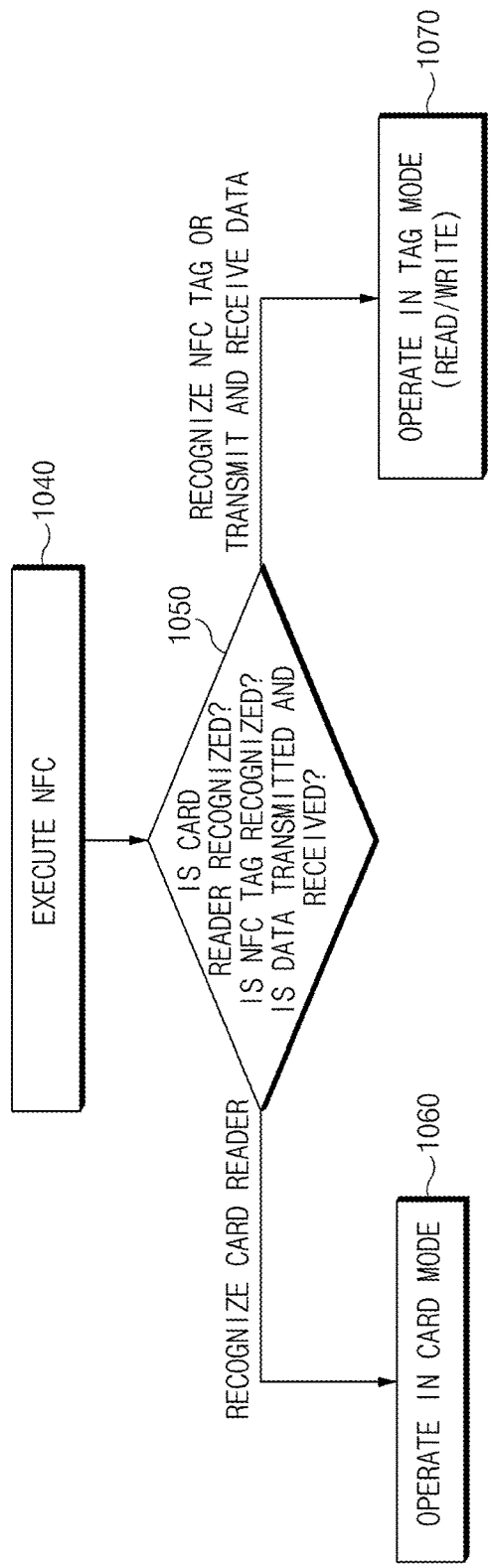
FIG. 10C illustrates a method of selecting a mode of NFC by a control circuit according to various embodiments of the present disclosure.

FIG. 10C illustrates a method of selecting a mode of NFC by a control circuit according to various embodiments of the present disclosure.

In operation 1040, the control circuit 1030 may execute an NFC communication function.

In operation 1050, the control circuit 1030 may determine any one trigger operation of an NFC function.

When the control circuit 1030 recognizes a card payment reader in operation 1050, the process may proceeds from operation 1050 to operation 1060. In operation 1060, the control circuit 1030 may be operated in a card mode.

When the control circuit 1030 recognizes an NFC tag or requests transmission and reception of data in operation 1050, the process may proceeds from operation 1050 to operation 1070. In operation 1070, the control circuit 1030 may be operated in a tag mode.

Figure 11A:
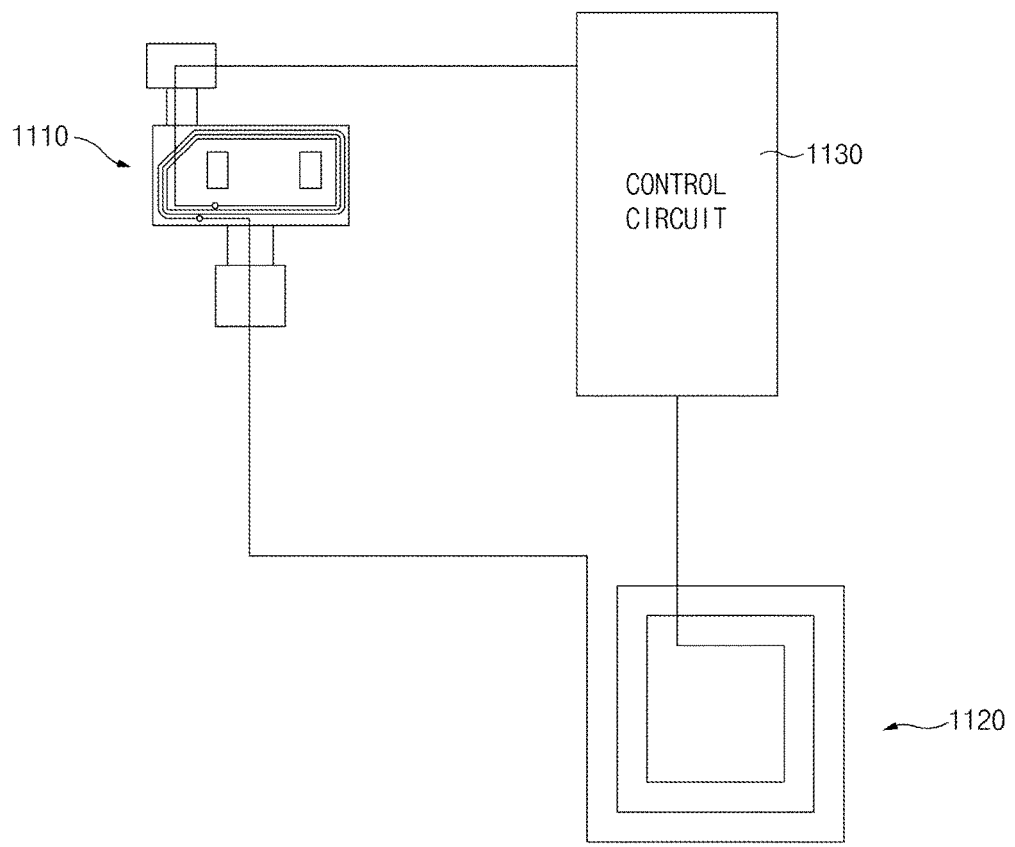
FIG. 11A illustrates a first antenna, a second antenna, and a control circuit according to various embodiments of the present disclosure.

FIG. 11A illustrates a first antenna, a second antenna, and a control circuit according to various embodiments of the present disclosure.

According to various embodiments of the present disclosure, the first antenna 1110 and the second antenna 1120 may be connected to each other to be connected to the control circuit 1130 as illustrated in FIG. 11A. The first antenna 1110 and the second antenna 1120 may be used in the same mode.

Figure 11B:
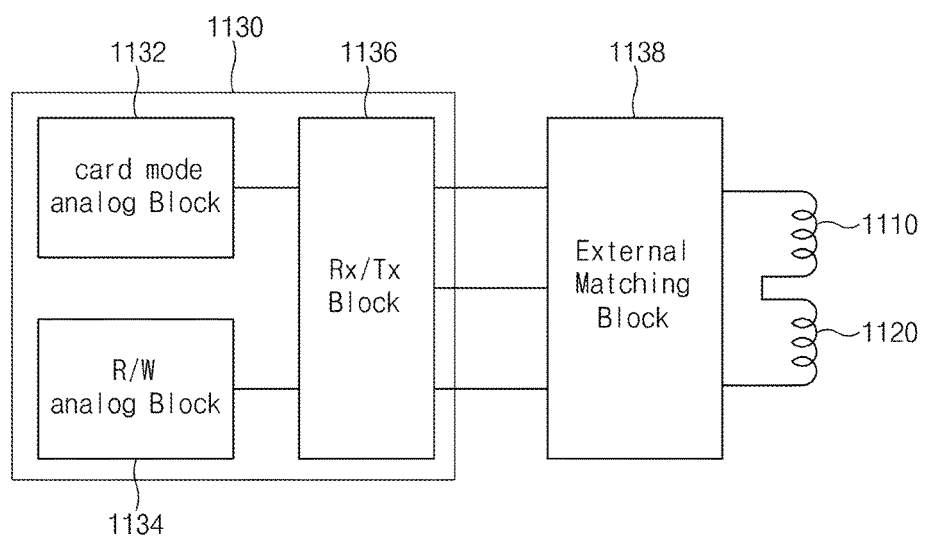
FIG. 11B illustrates a configuration of the control circuit, the first antenna, and the second antenna of FIG. 11A according to various embodiments of the present disclosure.

FIG. 11B illustrates a configuration of the control circuit, the first antenna, and the second antenna of FIG. 11A according to various embodiments of the present disclosure.

According to an embodiment, the control circuit 1130 may include a card emulation mode circuit 1132, a read/write mode circuit 1134, and a signal transmission/reception circuit 1136. Ends of the first antenna 1110 and the second antenna 1120 may be connected to each other to be connected to a signal transmission/reception circuit 1136 through a matching circuit 1138. When the antenna is used in a card emulation mode, the card emulation mode circuit 1132 may be operated. When the antenna is used in a read/write mode (or a P2P mode), the read/write mode circuit 1134 may be operated. The matching circuit 1138 may be designed such that the first antenna 1110 and the second antenna 1120 are operated at an intended frequency bands as one antenna.

Figure 12A:
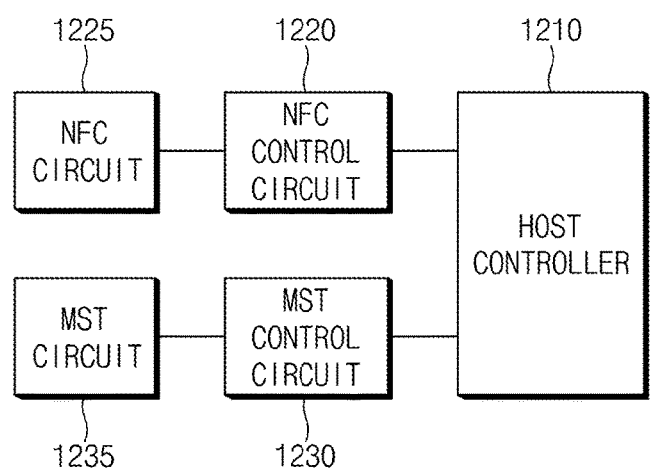
FIG. 12A illustrates illustrating a communication circuit according to various embodiments of the present disclosure.

FIG. 12A illustrates a communication circuit according to various embodiments of the present disclosure.

The communication circuit, for example, may include the control circuit 1030 of FIG. 10A and/or the control circuit 1130 of FIG. 11A. Referring to FIG. 12A, the communication circuit, for example, may selectively or simultaneously perform NFC communication and MST communication. The communication circuit may include a host controller 1210, an NFC control circuit 1220, an NFC circuit 1225, an MST control circuit 1230, and an MST circuit 1235. Although not illustrated in FIG. 12A, the communication circuit may be connected to a memory and the host controller 1210 may inquire the memory of a programmed operation.

According to various embodiments of the present disclosure, the host controller 1210 may correspond to the host controller 665 of FIG. 6. If the host controller 1210 of FIG.

6 controls NFC communication, the host controller of FIG. 12 may control MST communication as well as NFC communication.

The host controller 1210 may control the NFC control circuit 1220 when NFC communication is performed, and may control the MST control circuit 1230 when MST communication is performed. For example, the NFC control circuit 1220 and the MST control circuit 1230 may be connected to the host controller 1210 through a switch or the like, and may be at least selectively used by the host controller 1210.

The NFC circuit 1225 may include an NFC antenna (for example, the first antenna 1010 and the second antenna 1020 of FIG. 10A or the first antenna 1110 and the second antenna 1120 of FIG. 11A). Further, the NFC circuit 1225 may further include a matching circuit (for example, the matching circuit 1038 and the matching circuit 1039 of FIG. 10B and the matching circuit 1138 of FIG. 11B) for an NFC antenna.

According to an embodiment, the MST circuit 1235 may further include an MST antenna and a matching circuit. The MST antenna may include an MST antenna that is provided as an antenna for security payment in advance, and may be connected to the antenna pattern 424 stacked on the receiver 410 of FIG. 4.

An operation of using NFC communication and MST communication in a hybrid mode will be described later with reference to FIG. 13.

Figure 12B:
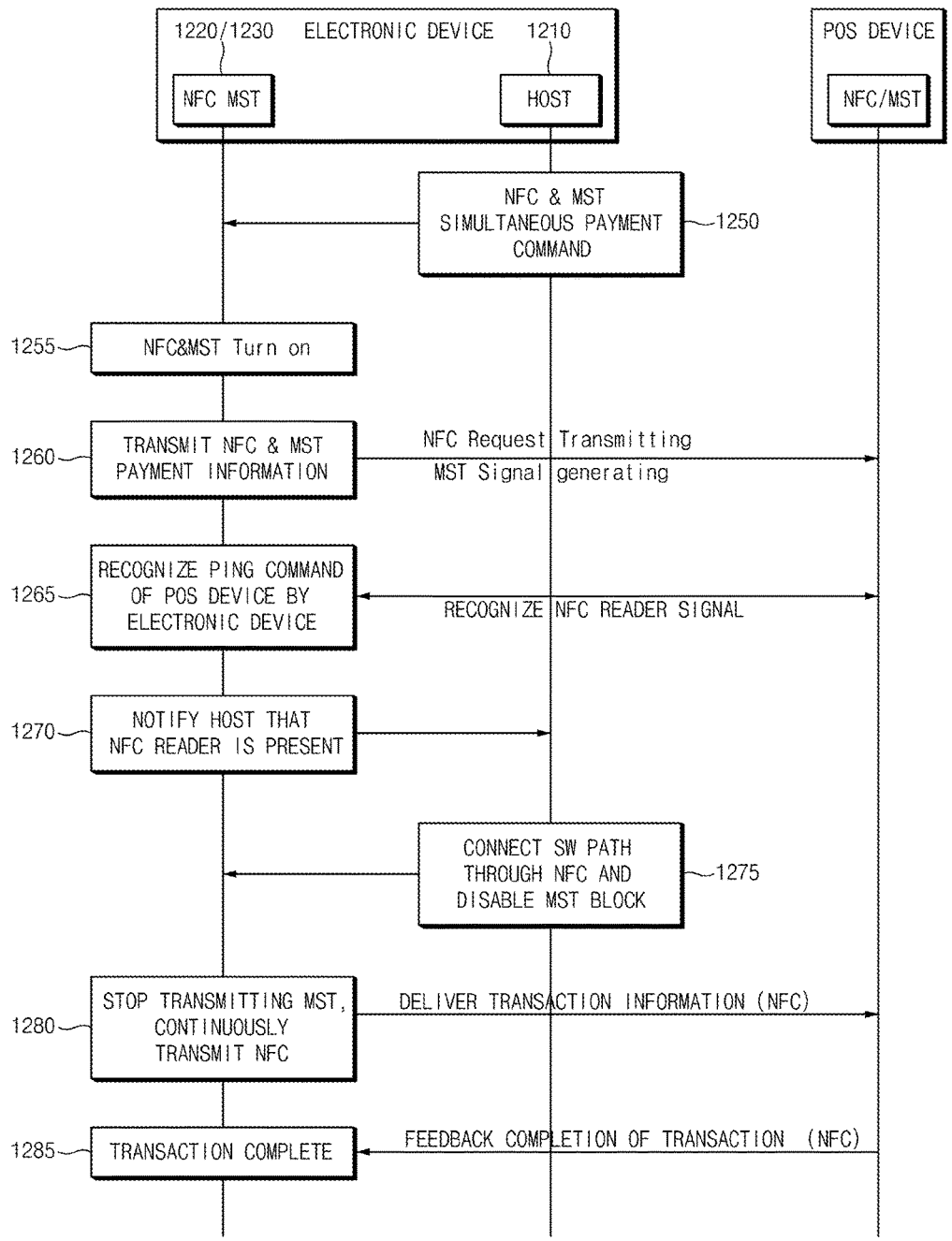
FIG. 12B illustrates an operation performed by the communication circuit of FIG. 12A according to various embodiments of the present disclosure.

FIG. 12B illustrates an operation performed by the communication circuit of FIG. 12A according to various embodiments of the present disclosure.

In operation 1250, the host controller 1210 may deliver a simultaneous NFC/MST payment command to an NFC control circuit 1220 and an MST control circuit 1230. The simultaneous NFC/MST payment command may be generated in response to a payment request received from the user. The simultaneous NFC/MST payment command may be performed to reduce a failure of payment when it is not certain whether a POS device that is to perform a payment supports an NFC payment or an MST payment.

In operation 1255, the NFC control circuit 1220 and the MST control circuit 1230 may activate NFC communication and MST communication, respectively.

In operation 1260, the NFC control circuit 1220 and the MST control circuit 1230 may deliver an NFC signal and an MST signal, which have been active in operation 1255, to the POS device.

In operation 1265, the NFC control circuit 1220 may determine that the POS device supports an NFC payment by recognizing a ping command of the POS device. According to various embodiments of the present disclosure, the POS device may be a device that supports an MST payment, but FIG. 12B assumes that the POS device supports only an NFC payment.

In operation 1270, the NFC control circuit 1220 may notify the host controller 1210 that the POS device supports an NFC payment.

In operation 1275, the host controller 1210 may connect a switch connected to the NFC control circuit 1220, and may open a switch connected to the MST control circuit 1230.

In operation 1280, the NFC control circuit 1220 may deliver transaction information as an NFC signal, and the MST control circuit 1230 may stop transmitting a signal.

In operation 1285, the NFC control circuit 1220 may terminate a transaction by receiving a transaction completion feedback from the POS device.

Figure 13A:
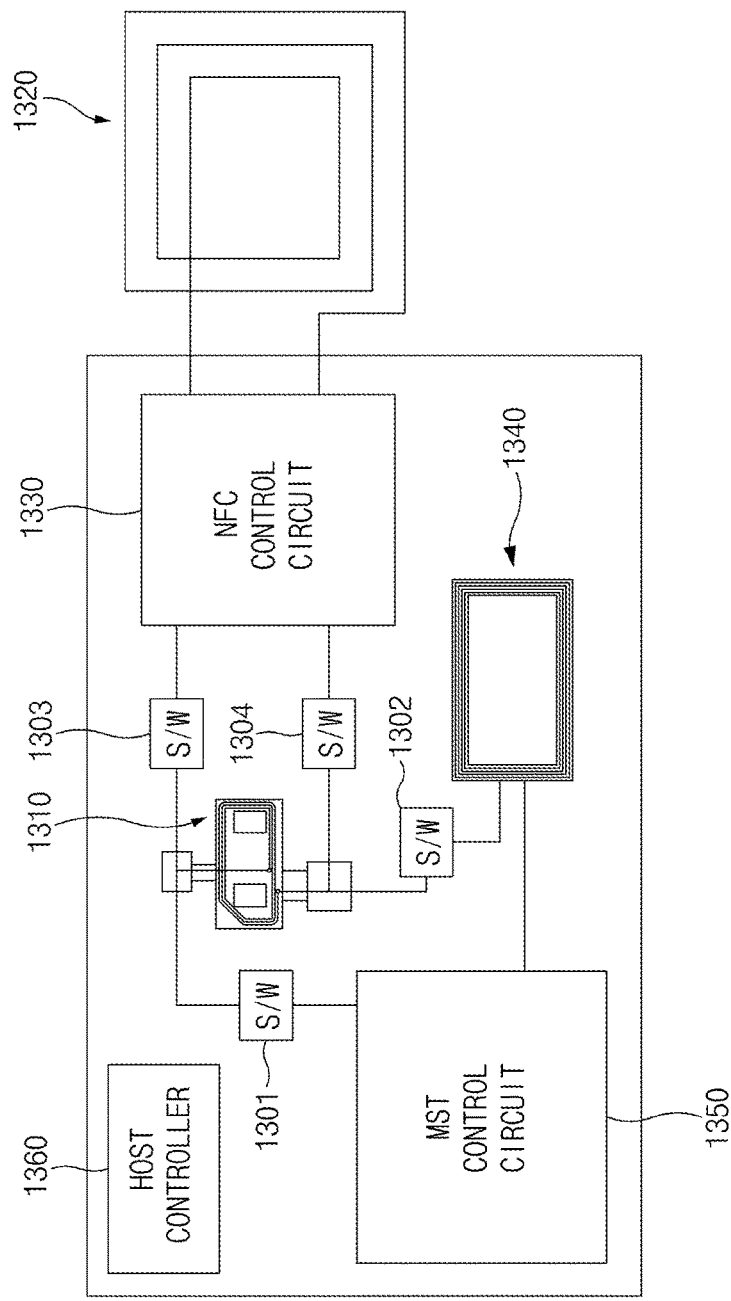
FIG. 13A illustrates a first communication circuit, a second communication circuit, and one or more antennas corresponding to the communication circuit, respectively according to various embodiments of the present disclosure.

FIG. 13A illustrates a first communication circuit, a second communication circuit, and one or more antennas corresponding to the communication circuit, respectively according to various embodiments of the present disclosure.

According to an embodiment, the electronic device may include a first antenna 1310 corresponding to a first communication network, a second antenna 1320, and an NFC control circuit 1330. Further, the electronic device may include an antenna 1340 (hereinafter, a third antenna 1340) corresponding to a second communication network and an MST control circuit 1350. According to various embodiments of the present disclosure, at least two of the antennas 1310, 1320, and 1340 may be mounted on the FPCB or on adjacent FPCBs.

According to various embodiments of the present disclosure, the first communication network may be an NFC network and the second communication network may be an MST network.

According to an embodiment, the first antenna 1310 is an NFC antenna, and may be used in a card emulation mode in the NFC control circuit 1330. Further, the second antenna 1320 also is an NFC antenna, and may be used in a read/write mode and a P2P mode in the NFC control circuit 1330. The second antenna 1320 may be used in a card emulation mode together with the first antenna 1310. The third antenna 1340 may be an MST antenna, and may be used for card payment in the MST control circuit 1350.

According to various embodiments of the present disclosure, referring to FIG. 13A, the first antenna 1310 may be connected to the NFC control circuit 1330 through switches 1303 and 1304. Further, the first antenna 1310 may be connected to the third antenna 1340 and the MST control circuit 1350 through switches 1302 and 1301. According to various embodiments of the present disclosure, the first antenna 1310 may be used by the NFC control circuit 1330 when the electronic device uses NFC communication. Further, the first antenna 1310 may be used by the MST control circuit 1350 when the electronic device uses MST communication.

For example, when the first antenna 1310 is used by the NFC control circuit 1330, the switches 1301 and 1302 connected to the first antenna 1310 may be opened and the switches 1303 and 1304 may be short-circuited. Further, when the first antenna 1310 is used by the MST control circuit 1350, the switches 1303 and 1304 connected to the first antenna 1310 may be short-circuited. The switches 1301 and 1304 may be controlled by the host controller 1360, based on a control signal received from a processor (for example, a communication processor (CP)).

Hereinafter, various embodiments that may be performed will be described in FIG. 13A.

According to an embodiment, the host controller 1360 may periodically switch the switches 1301 and 1302 and the switches 1303 and 1304. When the user brings the electronic device into contact with an NFC reader for a payment, the NFC control circuit 1330 may recognize a magnetic field of the NFC reader such that the host controller 1360 opens the switches 1301 and 1302 and short-circuits the switches 1303 and 1024. When payment information is received from the NFC reader, the MST control circuit 1350 may be switched off for reduction of power.

According to an embodiment, when the user brings the electronic device into contact with the MST reader for a payment, the host controller 1360 may short-circuit the switches 1301 and 1302 and the MST control circuit 1350 may repeatedly send payment information. While the payment information is repeatedly sent, the NFC control circuit 1330 may try detecting of an NFC field by short-circuiting the switches 1303 and 1304 through the host controller 1360. If an NFC field is detected, the NFC control circuit 1330 may open the switches 1301 and 1302 through the host controller 1360, and may short-circuit the switches 1303 and 1304.

According to various embodiments of the present disclosure, the NFC control circuit 1330 and the MST control circuit 1350 may continuously alternately transmit payment information regardless of counterpart payment devices (an NFC reader or an MST reader).

Figure 13B:
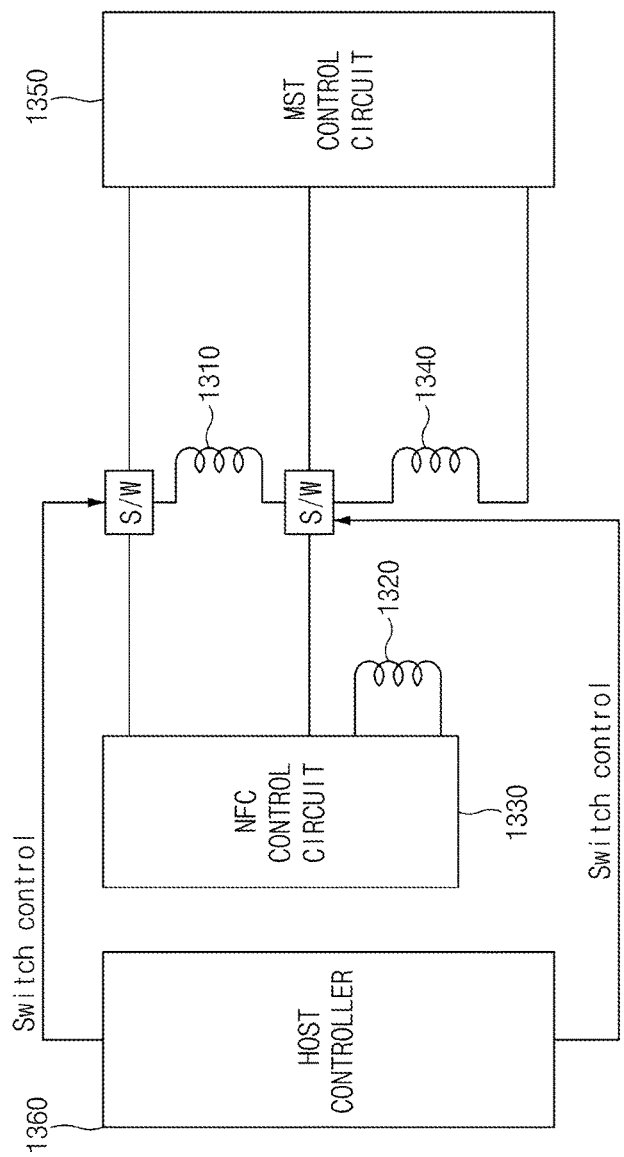
FIG. 13B illustrates a configuration of the control circuit, the first antenna, the second antenna, and the third antenna of FIG. 12A according to various embodiments of the present disclosure.
Figure 13C:
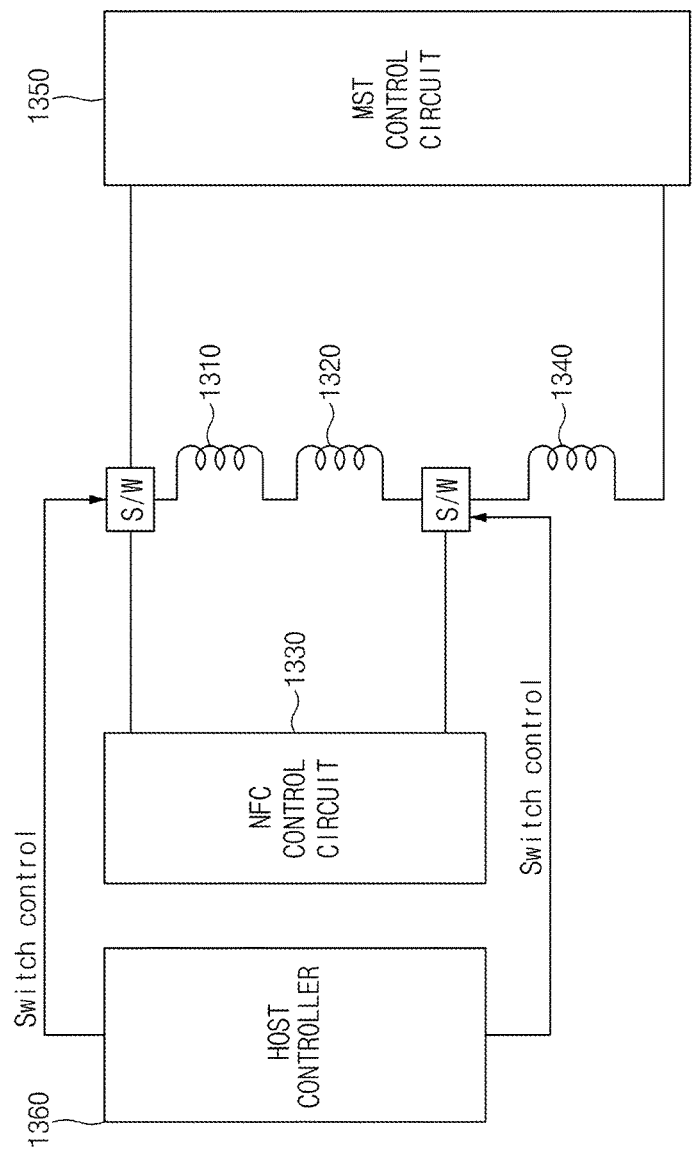
FIG. 13C illustrates a configuration of the control circuit, the first antenna, the second antenna, and the third antenna of FIG. 12A according to various embodiments of the present disclosure.

FIGS. 13B and 13C illustrate a configuration of the control circuit, the first antenna, the second antenna, and the third antenna of FIG. 13A according to various embodiments of the present disclosure.

Referring to FIG. 13B, the first antenna 1310 and the second antenna 1320 may be connected to the NFC control circuit 1330 in independent antenna patterns similarly to those of FIG. 10A. Further, the first antenna 1310 may be connected to the MST control circuit 1350 together with the third antenna 1340 to support an MST payment. The first antenna 1310 may be connected to the NFC control circuit 1330 or the MST control circuit 1350 by using a switch. The switch may be opened and short-circuited by the host controller 1360.

According to various embodiments of the present disclosure, referring to FIG. 13C, ends of the first antenna 1310 and the second antenna 1320 may be connected to each other to be connected to the NFC control circuit 1330. Further, the first antenna 1310 and the second antenna 1320 may be connected to the MST control circuit 1350 together with the third antenna 1340 to support an MST payment, and a switch may be connected to the first antenna 1310 and the second antenna 1320 to be connected to the NFC control circuit 1330 or the MST control circuit 1350 according to the states of the first antenna 1310 and the second antenna 1320. The switch may be opened and short-circuited by the host controller 1360.

Figure 14:
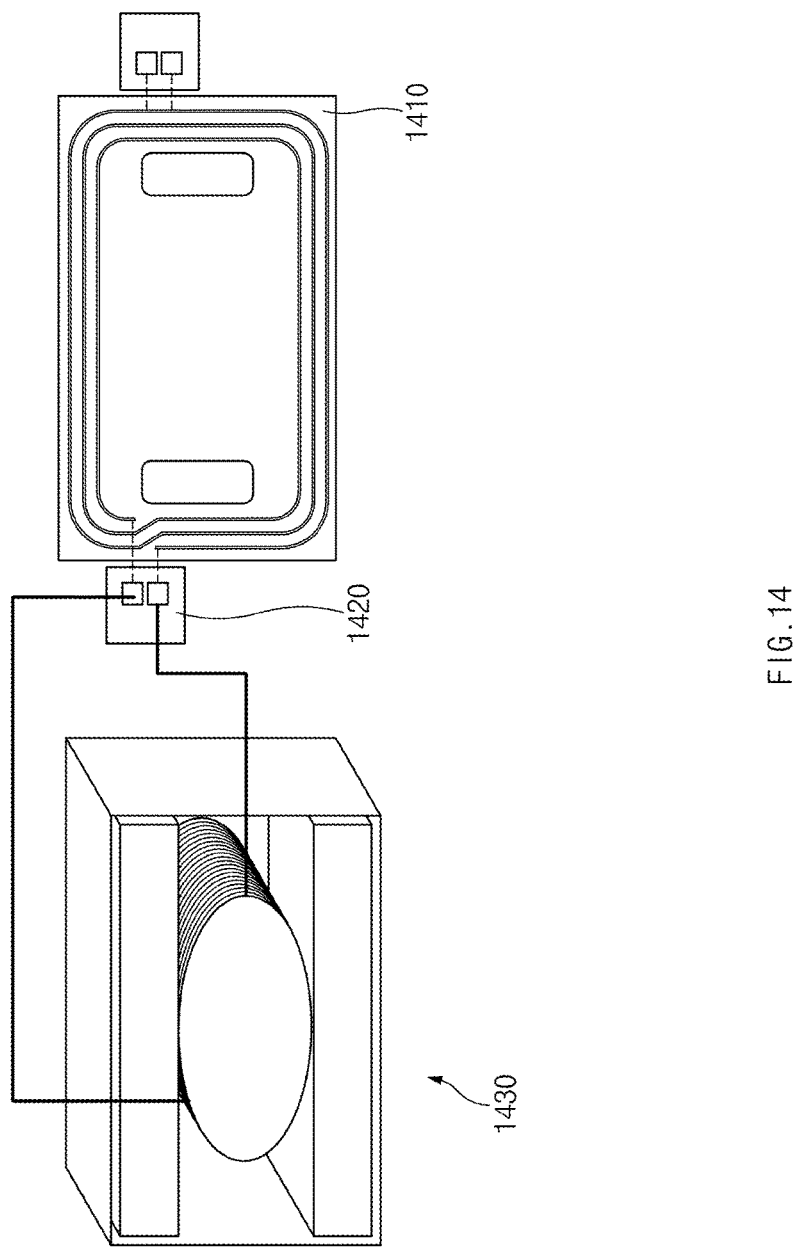
FIG. 14 illustrates a voice coil connected to an antenna pattern according to various embodiments of the present disclosure.

FIG. 14 illustrates a voice coil connected to an antenna pattern according to various embodiments of the present disclosure. According to various embodiments of the present disclosure, the antenna 1410 may be connected to an MST antenna and an MST communication circuit.

In the MST communication circuit, a voice coil of a receiver 1430 as well as the MST antenna and the antenna 1410 (for example, an NFC antenna) may be used in MST communication. Referring to FIG. 14, the antenna pattern of the antenna 1410 may be connected to the voice coil of the receiver 1430 through an expansion panel 1420.

Figure 15:
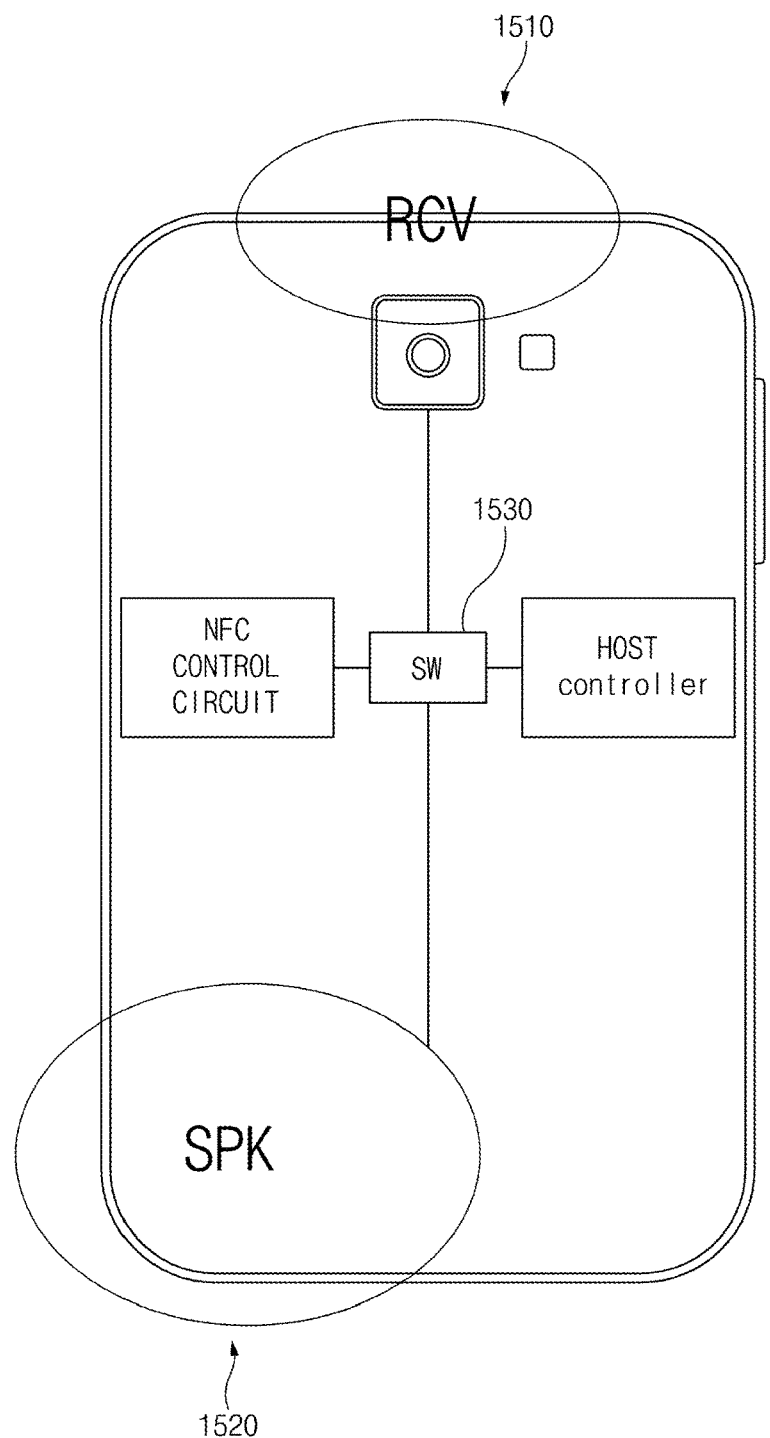
FIG. 15 illustrates an electronic device in which an antenna is coupled to a receiver and a speaker according to various embodiments of the present disclosure.

FIG. 15 illustrates an electronic device in which an antenna is coupled to a receiver and a speaker according to various embodiments of the present disclosure.

According to an embodiment, a printed circuit board and a flexible printed circuit board in which an antenna pattern is arranged may be attached on rear surfaces of a receiver 1510 or a speaker 1520. The receiver 1510 may include a piezoelectric plate, a voice coil, or a permanent magnet. Further, the principle in which the speaker 1520 generates a sound is the same as that of the receiver 1510, and thus the speaker 1520 may include a piezoelectric plate, a voice coil, or a permanent magnet like the receiver 1510.

According to various embodiments of the present disclosure, referring to FIG. 15, the electronic device may include an NFC control circuit (for example, the NFC control circuit 1220 of FIG. 12A), a host controller (for example, the host controller 1210 of FIG. 12A), and a switch 1530. According to various embodiments of the present disclosure, when the electronic device uses the receiver 1510, for example, a voice of a counterpart is provided to the user through transmission and reception of a call, an antenna corresponding to the speaker 1520 may be used for communication. Further, when the electronic device uses the speaker 1520, for example, when a sound source is reproduced through an application or a web browser installed in the electronic device, an antenna corresponding to the receiver 1510 may be used for communication. For the operation, the switch 1530 may connect one antenna to the NFC communication circuit, and may connect the receiver 1510 or the speaker 1520 that is to be used for the original purpose to the host controller.

Figure 16B:
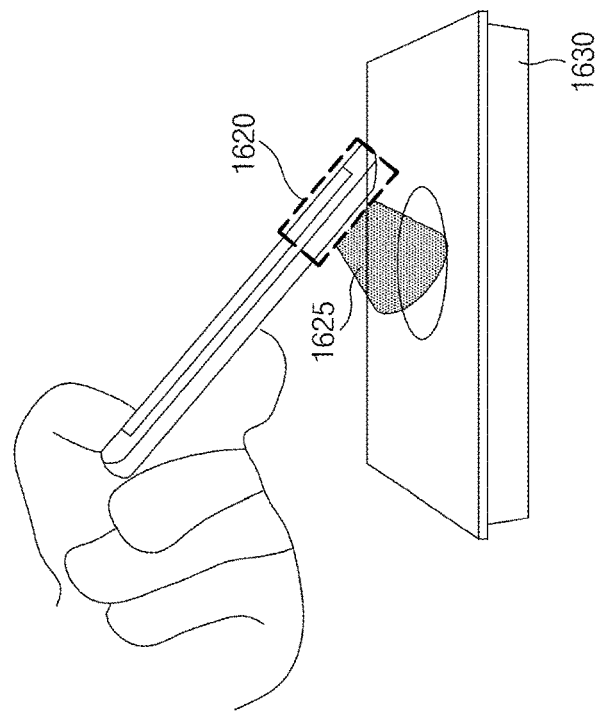
FIGS. 16A and 16B illustrates convenience of the user based on a location of an antenna in an electronic device according to various embodiments of the present disclosure.
Figure 16A:
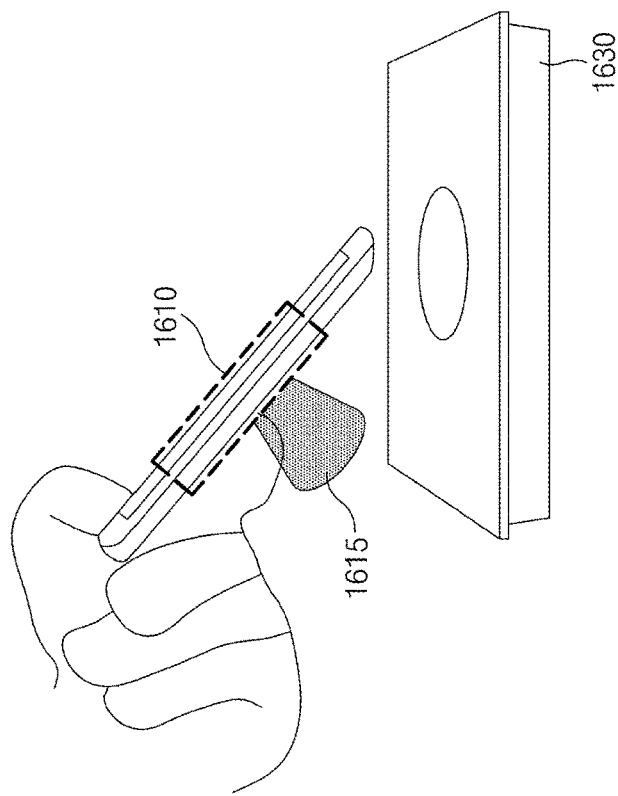

FIGS. 16A and 16B illustrates convenience of the user based on a location of an antenna in an electronic device according to various embodiments of the present disclosure.

FIG. 16A illustrates that an antenna 1610 is situated at an intermediate part of an electronic device, and FIG. 16B illustrates that an antenna 1620 is situated at an upper end of the electronic device.

Referring to FIGS. 16A and 16B, when the user brings the electronic device into contact with a reader 1630 while gripping the electronic device, a radiation area 1615 by the antenna 1610 does not contact an intermediate part of the reader 1630, resulting in a failure in communication. In this case, the user has to perform communication while the electronic device is parallel to the reader 1630. Referring to FIG. 16B, as the antenna 1620 is situated at an upper end of the electronic device, a radiation area 1625 by an antenna 1620 comes into contact with the intermediate part of the reader 1630, resulting in successful communication when the user takes the electronic device towards the reader 1630 while inclining the electronic device or positions an upper end of the electronic device on the reader 1630.

According to various embodiments of the present disclosure, when a payment is made through the electronic device, the electronic device may perform authentication of the user through biometric information, for example, a fingerprint recognition service. The user may allow the electronic device to recognize a fingerprint and take the electronic device to the reader at the same time to save time. It will be more difficult to make the electronic device and the reader parallel to each other while a fingerprint is recognized through the thumb than to take the electronic device to the reader while the electronic device is inclined.

Further, when the antenna is situated on a front surface of the electronic device, the user has to take the electronic device to the reader after overturning the electronic device, which is troublesome. In this case, it may be difficult to perform a payment through communication while the electronic device recognizes a fingerprint.

Accordingly, in various embodiments of the present disclosure, convenience of the user may be achieved as the antenna is situated on a rear surface of an upper end of the electronic device.

Figure 17:
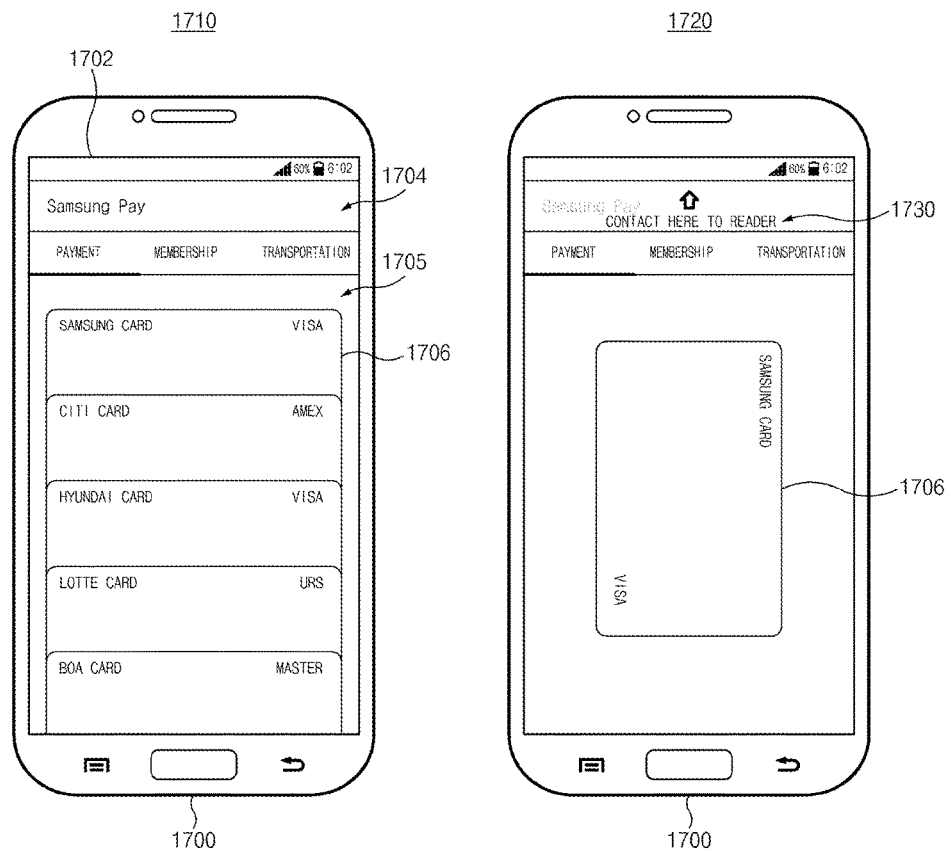
FIG. 17 illustrates an application execution screen of a payment application according to various embodiments of the present disclosure.

FIG. 17 illustrates an application execution screen of a payment application according to various embodiments of the present disclosure.

The electronic device 1700 may display a payment application 1704 on a screen 1702 based on a request of the user.

View 1710 of FIG. 17 is a first execution screen of a payment application and a plurality of payment means 1705 stored in the payment application 1704 may be listed. View 1720 of FIG. 17 may be performed when one payment means 1706 of the plurality of payment means listed in the payment application of view 1710 is selected.

In view 1720, the payment application 1704 may display the selected payment means 1706 largely, and message 1730 "CONTACT HER TO READER" may be displayed at an upper end of payment application 1704 that is closed to a receiver. Message 1730 allows the user to take a receiver, in which an antenna is mounted, towards a reader (for example, the NFC reader of the POS device), and the present disclosure is not limited to the contents of message 1730.

According to various embodiments of the present disclosure, there is provided an electronic device including a first antenna pattern for a first communication network, a first communication circuit that performs communication through the first antenna pattern, an electrical component that is situated at an upper part of the electronic device, and a circuit board that is attached to a rear surface of the electrical component, wherein the first antenna pattern is arranged on the circuit board facing toward a rear surface of the electronic device.

According to various embodiments of the present disclosure, the electronic device may further include a second antenna pattern for the first communication network, and a communication mode that is performed by the first communication circuit through the first antenna pattern may be different from a communication mode that is performed through the second antenna pattern.

According to various embodiments of the present disclosure, the first communication network may be a near field communication (NFC) network, and the first communication circuit may be operated in a card emulation mode through the first antenna pattern.

According to various embodiments of the present disclosure, the second antenna pattern may be disposed at a middle part of the electronic device to face the rear surface of the electronic device.

According to various embodiments of the present disclosure, the electrical component may include at least one of a receiver, a speaker, a proximity sensor, an illumination sensor, or a service LED.

According to various embodiments of the present disclosure, the electronic device further include a shielding sheet that shields a magnetic field by an eddy current generated by the electrical component, and the shielding sheet is disposed between the electrical component and the circuit board.

According to various embodiments of the present disclosure, the electronic device may further include a heat sink plate that is disposed between the electrical component and the circuit board.

According to various embodiments of the present disclosure, the circuit board may have a multilayered structure, and the first antenna pattern may be arranged on one layer of the circuit board or may be arranged on two or more layers of the circuit board.

According to various embodiments of the present disclosure, the electronic device further include a third antenna pattern for a second communication network, and a second communication circuit that performs communication for a payment service through the third antenna pattern.

According to various embodiments of the present disclosure, the first antenna pattern and the third antenna pattern may be connected to each other, and the second communication circuit performs communication through the first antenna pattern and the third antenna pattern for the payment service.

According to various embodiments of the present disclosure, the circuit board may include at least one of a printed circuit board (PCB) or a flexible printed circuit board (FPCB).

According to various embodiments of the present disclosure, the circuit board may include one or more radiation holes.

According to various embodiments of the present disclosure, the electronic device may further include a fourth antenna pattern that is operated for a first communication network, a second electrical component that is situated at a lower part of the electronic device, and a second circuit board that is attached to a rear surface of the second electrical component, and the fourth antenna pattern may be arranged on the second circuit board to face the rear surface of the electronic device.

According to various embodiments of the present disclosure, the first communication circuit may perform communication by selectively using the first antenna pattern and the fourth antenna pattern.

According to various embodiments of the present disclosure, there is provided an electronic device including a housing that includes a first surface and a second surface that faces an opposite side of the first surface, a communication circuit that is disposed in an interior of the housing, at least one electrical component that is disposed in the interior of the housing to be closer to the first surface than to the second surface, a conductive plate, at least a portion of which is disposed between the at least one electrical component and the second surface and that is configured to shield at least a portion of an electric field and/or a magnetic field generated by the at least one electrical component, a printed circuit board (PCB) that is disposed between the conductive plate and the second surface, and a conductive pattern that is disposed in an interior of and/or on at least one surface of the printed circuit board and is electrically connected to the communication circuit.

According to various embodiments of the present disclosure, the at least one electrical component may include a speaker.

According to various embodiments of the present disclosure, at least a portion of the at least one electrical component may be exposed to the first surface.

According to various embodiments of the present disclosure, the electronic device may further include a display that is exposed to the first surface.

According to various embodiments of the present disclosure, the electronic device may further include a second conductive pattern that is disposed in the interior of the housing and is electrically connected to the communication circuit.

According to various embodiments of the present disclosure, the electronic device further include a control circuit that is electrically connected to the conductive pattern, the second conductive pattern, and the communication circuit, and the control circuit may selectively provide a first electrical path provided with the conductive pattern, a second electrical path provided with the second conductive pattern, or a third electrical path provided with the conductive pattern and the second conductive pattern.

According to various embodiments of the present disclosure, the electronic device may further include a second communication circuit that is electrically connected to the conductive pattern, and a control circuit that is electrically connected to the communication circuit and the second communication circuit, and the control circuit may be configured to selectively provide a first state in which the conductive pattern and the communication circuit are electrically connected to each other and a second state in which the conductive pattern and the second communication circuit are electrically connected to each other.

The term "module" used in the specification may mean a unit including, for example, one of hardware, software, or firmware or a combination of the two or more of them. The module may be interchangeably used, for example, with a unit, logic, a logical block, a component, or a circuit. The module may be a minimum unit or a part of an integrally configured part. The module may be a minimum unit or a part which performs one or more functions. The module may be implemented mechanically or electromagnetically. For example, the module may include at least one of an application-specific integrated circuit (ASIC) chip, a field-programmable gate array, or a programmable-logic device, which has been known, will be developed in the future, or performs certain operations.

At least some of the devices (for example, modules or functions) or methods (for example, operations) according to various embodiments of the present disclosure may be implemented by an instruction stored in a computer-readable storage medium, for example, in the form of a program module. When the instruction is executed by the processor (for example, the processor 120), the at least one processor may perform a function corresponding to the instruction. The computer-readable storage medium may be, for example, a memory 130.

The computer-readably storage medium may include a hard disk, a floppy disk, a magnetic medium (for example, a magnetic tape), an optical medium (for example, a compact disk read only memory (CD-ROM)), a digital versatile disk (DVD), a magneto-optical medium (for example, a floptical disk), a hardware device (for example, a read only memory (ROM), a random access memory (RAM), or a flash memory). Further, the program instructions may include high-level language codes which may be executed by a computer using an interpreter as well as machine languages created by using a compiler. The above-mentioned hardware device may be configured to be operated as one or more software module to perform operations of various embodiments, and the converse is true.

The module or program module according to various embodiments of the present disclosure may include at least one of the above-mentioned elements, omit some of them, or further include other elements. The module, the program module, or the operations performed by other elements according to various embodiments of the present disclosure may be performed in a sequential, parallel, iterative, or heuristic method. Further, some operations may be executed in another sequence or may be omitted, or other operations may be added. Further, the embodiments disclosed in the specification are provided to describe the technical contents or for understanding of the technical contents, and the technical scope of the present disclosure is not limited thereto. Accordingly, the scope of the present disclosure should be construed to include all changes or various embodiments based on the technical spirit of the present disclosure.

According to various embodiments of the present disclosure, recognition errors by a user may be reduced and performance may be improved while communication is performed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile apparatus comprising:
a housing;
a front cover;
a circuit board disposed in the housing, the circuit board including a first side facing toward the front cover, a second side facing toward a rear side of the housing, and a first antenna pattern provided on the second side of the circuit board;
a shielding member disposed on the first side of the circuit board and between an electrical component and the circuit board, the shielding member configured to shield the first antenna pattern from the electrical component;
the electrical component disposed on the shielding member; and
a first communication circuit configured to perform communication through the first antenna pattern
wherein the first antenna pattern corresponds to a loop type antenna, and
wherein the first antenna pattern is disposed around one or more first radiation holes on the second side.

2. The mobile apparatus of claim 1,
wherein the electrical component comprises a speaker.

3. The mobile apparatus of claim 2, wherein the electrical component comprises the one or more first radiation holes facing toward the circuit board.

4. The mobile apparatus of claim 3, wherein the circuit board comprises one or more second radiation holes corresponding to the first radiation holes.

5. The mobile apparatus of claim 4,
wherein at least a portion of the electrical component is exposed through an opening provided in the front cover.

6. The mobile apparatus of claim 2, further comprising:
a heat sink plate disposed between the shielding member and the electrical component.

7. The mobile apparatus of claim 2, wherein the shielding member is configured to provide a magnetic shield to the antenna pattern from an eddy current generated by the electrical component.

8. The mobile apparatus of claim 2, further comprising:
a second antenna pattern facing toward a rear surface of the housing,
wherein, when viewed from the rear side of the housing, the first antenna pattern and the second antenna pattern do not overlap each other.

9. The mobile apparatus of claim 2, wherein the communication circuit is configured to provide near field communication (NFC) via the first antenna pattern.

10. A mobile apparatus comprising:
a front cover facing a first direction;
a housing including a rear side facing a second direction opposite to the first direction;
a circuit board disposed in the housing, the circuit board including a first side facing toward the front cover and a second side facing toward the rear side of the housing;
a speaker disposed on the first side of the circuit board;
a first antenna pattern provided on an area corresponding to the speaker on the second side of the circuit board, the first antenna pattern facing toward a rear side of the housing;
a shielding member disposed between the speaker and the circuit board, the shielding member configured to shield the first antenna pattern from the speaker; and
a first communication circuit configured to perform communication through the first antenna pattern, wherein the speaker is configured to provide sound output through an opening in the front cover,
wherein the first antenna pattern corresponds to a loop type antenna, and
wherein the first antenna pattern is centered around two third radiation holes on the second side.

11. The mobile apparatus of claim 10, wherein the speaker comprises a first radiation hole facing toward the front cover.

12. The mobile apparatus of claim 11, wherein the speaker further comprises the two second radiation holes facing toward the circuit board.

13. The mobile apparatus of claim 12, wherein the circuit board comprises two third radiation holes corresponding to the two second radiation holes.

14. The mobile apparatus of claim 10, further comprising a heat sink plate disposed between the shielding member and the speaker.

15. The mobile apparatus of claim 10, wherein the shielding member is configured to provide a magnetic shield to the antenna pattern from an eddy current generated by the speaker.

16. The mobile apparatus of claim 10, further comprising:

a second antenna pattern facing toward the rear side of the housing, wherein, when viewed from the rear side of the housing, the first antenna pattern and the second antenna pattern do not overlap each other.

17. The mobile apparatus of claim 16, wherein, when viewed from the rear side of the housing, the first antenna pattern is disposed on an upper part of the mobile apparatus and the second antenna pattern is disposed on a middle-lower part of the mobile apparatus.

18. The mobile apparatus of claim 10, wherein the communication circuit is configured to provide near field communication (NFC) via the first antenna pattern.

* * * * *